United States Patent
Berntorp et al.

(10) Patent No.: US 11,474,263 B2
(45) Date of Patent: *Oct. 18, 2022

(54) SYSTEM AND METHOD FOR GNSS AMBIGUITY RESOLUTION

(71) Applicant: Mitsubishi Electric Research Laboratories, Inc., Cambridge, MA (US)

(72) Inventors: Karl Berntorp, Cambridge, MA (US); Marcus Greiff, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 266 days.

This patent is subject to a terminal disclaimer.

(21) Appl. No.: 16/789,455

(22) Filed: Feb. 13, 2020

(65) Prior Publication Data

US 2021/0255335 A1 Aug. 19, 2021

(51) Int. Cl.
 *G01S 19/44* (2010.01)
 *G01S 19/39* (2010.01)

(52) U.S. Cl.
 CPC ............ *G01S 19/44* (2013.01); *G01S 19/393* (2019.08)

(58) Field of Classification Search
 CPC ........ G01S 19/393; G01S 19/44; G01S 19/47; G01S 19/49
 See application file for complete search history.

(56) References Cited

U.S. PATENT DOCUMENTS

| 6,259,398 B1 * | 7/2001 | Riley ............... G01S 19/44 342/357.77 |
| 9,000,975 B2 * | 4/2015 | Wendel ............ G01S 19/44 342/357.27 |
| 2011/0140959 A1 * | 6/2011 | Vollath ............ G01S 19/44 342/357.27 |

FOREIGN PATENT DOCUMENTS

| EP | 2966477 A1 * | 1/2016 | ........... G01S 19/073 |
| WO | WO-2010073113 A1 * | 7/2010 | ............. G01S 19/42 |

OTHER PUBLICATIONS

Offer, Charles et al., "Use of Inertial Integration to Enhance Availability for Shipboard Relative GPS (SRGPS)", ION GNSS 19th International Technical Meeting of the Satellite Division, Sep. 26-29, 2006, Fort Worth, TX (Year: 2006).*

* cited by examiner

*Primary Examiner* — Cassi J Galt
(74) *Attorney, Agent, or Firm* — Gennadiy Vinokur; Hironori Tsukamoto

(57) ABSTRACT

A system for tracking a state of a GNSS receiver uses a subset of the measurements of satellite signals selected to minimize a loss of information with respect to the set of measurements available to the GNSS receiver. The system uses a probabilistic state estimator that tracks the state of the GNSS receiver using a probabilistic motion model subject to noise and a probabilistic measurement model relating the selected subset of the measurements of satellite signals to the current state of the receiver.

17 Claims, 27 Drawing Sheets

| Notation | Description | Unit |
|---|---|---|
| $P$ | Code observation | m |
| $\rho$ | Distance between the receiver and the satellite | m |
| $c$ | Speed of light | m/s |
| $\delta T$ | Receiver clock bias | s |
| $\delta t$ | Satellite clock bias | s |
| $I$ | Ionospheric delay | m |
| $T$ | Tropospheric delay | m |
| $\varepsilon$ | Code observation noise | m |
| $\lambda$ | Carrier wavelength | m |
| $\Phi$ | Carrier phase observation | cycles |
| $n$ | Integer ambiguity | cycles |
| $\eta$ | Carrier observation noise | m |

FIG. 1C

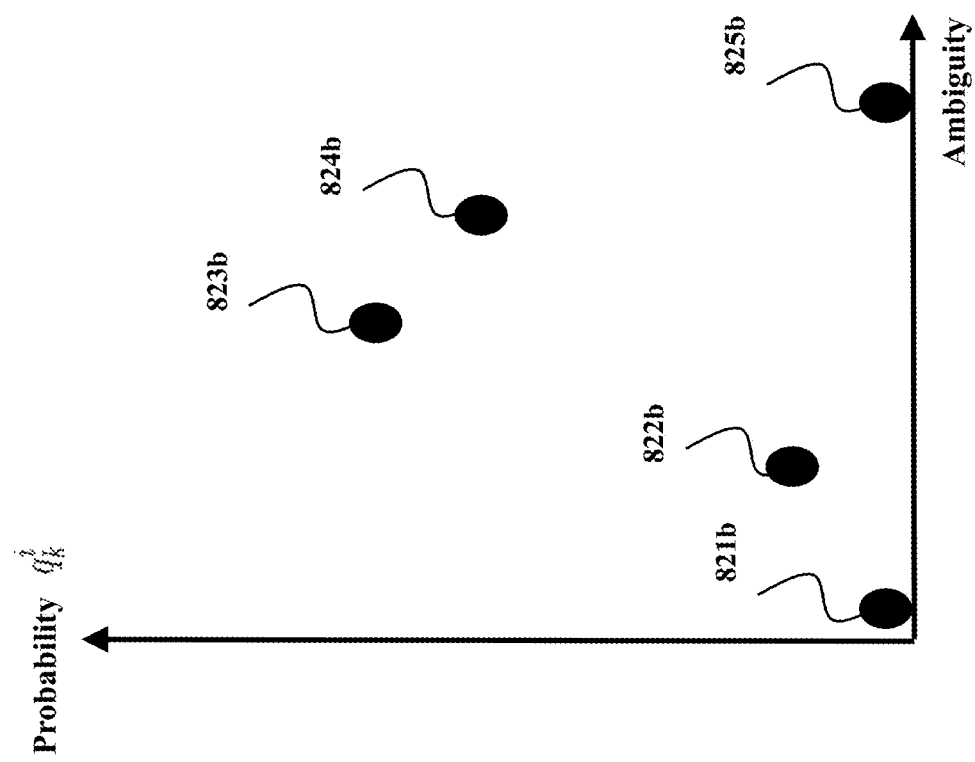

SYSTEM AND METHOD FOR GNSS AMBIGUITY RESOLUTION

TECHNICAL FIELD

This invention relates generally to positioning systems, such as the global positioning system (GPS) or the Quasi-Zenith Satellite System (QZSS), and more particularly to resolve integer ambiguities in carrier-phase measurements by receivers in such positioning systems.

BACKGROUND

A Global Navigation Satellite System (GNSS) is a system of satellites that can be used for determining the geographic location of a mobile receiver with respect to the earth. GNSS include GPS, Galileo, Glonass, QZSS, and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a mobile receiver?, with the purpose of achieving quicker and more accurate calculation of the mobile receiver's geographic position.

Various position estimation methods are known wherein the position calculations are based on repeated measurement of the so-called pseudo range and carrier phase observables by Earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles, that is, an integer number of wavelengths, that have elapsed before a lock-in to this signal alignment has been obtained. This number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

When GNSS signals are continuously tracked and no loss-of-lock occurs, the integer ambiguities resolved at the beginning of a tracking phase can be kept for the entire GNSS positioning span. The GNSS satellite signals, however, may be occasionally shaded (e.g., due to buildings in "urban canyon" environments), or momentarily blocked (e.g. when the receiver passes under a bridge or through a tunnel). Generally, in such cases, the integer ambiguity values are lost and must be re-determined. This process can take from a few seconds to several minutes. In fact, the presence of significant multipath errors or unmodeled systematic biases in one or more measurements of either pseudorange or carrier phase may make it difficult with present commercial positioning systems to resolve the ambiguities. As the receiver separation (i.e., the distance between a reference receiver and a mobile receiver whose position is being determined) increases, distance-dependent biases (e.g. orbit errors and ionospheric and tropospheric effects) grow, and, as a consequence, reliable ambiguity resolution (or re-initialization) becomes an even greater challenge. Furthermore, loss-of-lock can also occur due to a discontinuity in a receiver's continuous phase lock oi a signal, which is referred to as a cycle slip. For instance, cycle slips can be caused by a power loss, a failure of the receiver software, or a malfunctioning satellite oscillator. In addition, cycle slip can be caused by changing ionospheric conditions.

GNSS enhancement refers to techniques used to improve the accuracy of positioning information provided by the Global Positioning System or other global navigation satellite systems in general, a network of satellites used for navigation. For example, some methods use differencing techniques based on differencing between satellites, differencing between receivers, differencing between epochs, and combination thereof. Single and double differences between satellites and the receivers reduce the error sources, either explicitly or approximately. However, for GNSS, each satellite can transmit carrier and code measurements on several frequency bands, and that in combination with the different satellites that can be used for differencing measurements implies a size of measurement dimensionality that can be prohibitive in real-time GNSS positioning.

Consequently, there is a need for a method for reducing the measurement dimensionality while preserving quality of GNSS positioning.

SUMMARY

It is an object of some embodiments to provide a method and a system for tracking a positon of a receiver in Global Navigation Satellite System (GNSSs). GNSS satellite measurements include so-called pseudo range and carrier phase observables by Earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver.

In general, a GNSS can use multiple constellations at the same time to determine the receiver state. For example, GPS, Galileo, Glonass, and QZSS can be used concurrently. Satellite systems typically transmit information at up to three different frequency bands, and for each frequency band, each satellite transmits a code measurement and a carrier-phase measurement. These measurements can be combined as either single differenced or double differenced, wherein a single difference includes taking the difference between a reference satellite and other satellites, and wherein double differencing includes differencing also between the receiver of interest and a base receiver with known static location.

Accurate carrier-phase integer ambiguity resolution is fundamental for high precision GNSSs. It is an object of some embodiments to disclose a method for reducing complexity of the estimation procedure used for ambiguity resolution. Additionally, or alternately, it is an object of some embodiments to provide an ambiguity resolution method suitable for utilization in state estimators, such as position estimation filters, providing state estimates based on a motion model and a measurement model. The position estimation filters can be advantageous, because the ambiguity resolution is typically only an intermediate step in position estimation, not the ultimate objective.

An example of a state estimator is a Kalman filter, which uses a series of measurements observed over time, containing statistical noise and other inaccuracies, and produces estimates of unknown variables that tend to be more accurate than those based on a single measurement alone, by estimating a joint probability distribution over the variables for each timeframe. The Kalman filter keeps track of the estimated state of the system and the uncertainty of the estimate. The estimate is updated using motion model of state transitions and the measurements. Some embodiments use a Kalman filter based system with a motion model subject to process noise of a GNSS receiver and a measurement model of satellites signals subject to measurement noise.

The motion model and the measurement model can be used by a state estimator to track a state of GNSS receiver. However, when the information available to the motion model is typically fixed, the information available to the measurement model may vary based on a number of satellites in a line-of-sight (LOS) of tracked GNSS receiver. It is an object of some embodiments to select a portion of available measurements sufficient and/or optimal for position tracking by state estimators from accuracy and computational efficiency point of view.

The measurements of different combination of satellites can be represented as a measurement matrix. Each element of a matrix is a single or double differenced measurement of at least one unique pair of satellites and/or receivers. Different satellites and/or receivers can be grouped in different pairs to increase dimensionality of the measurement matrix. Each measurement carries information that can be used for position estimation. To that end, it can be possible to use the measurement matrix in its entirety for position estimation. However, in some situations, the dimensionality of the measurement matrix caused by availability of line-of-sight (LOS) satellites for the tracked GNSS receiver prohibitively increases computational complexity of position estimation filters.

Some embodiments are based on recognition that only a portion of all available measurements from measurement matrix can be used in state estimators. Typically, measurements from at least four LOS satellites are needed for accurate position estimation. Because the measurement matrix includes measurements representing a pair of satellites, at least two elements of the measurement matrix are needed for position estimation. To that end, it is possible that any two elements of the matrix can be selected. Such a selection can be random or following some selection principle. Examples of such a principle include selecting randomly a single satellite and collecting a predetermined number of measurements of differences between the selected satellite and other LOS satellites. However, such an approach can be suboptimal from an information quality point of view.

Some embodiments are based on recognition that different elements of measurement matrix can have different informational value to the position estimation filter. As an illustrative example, a pair of satellite positions on the same LOS with respect to the GNSS receiver has less informative value than a pair of satellites positioned on different LOS. This is because they provide the same geometric information of the receiver.

Accordingly, different measurements in the measurement matrix carry different amount of information about position of the GNSS receiver. Some embodiments are based on realization that it is possible to select a predetermined number of measurements with maximum total information about the position. Because the number of selected measurements is predetermined from computational point of view, but the measurements are selected from available measurements based on informative value point of view, the selected combination improves the accuracy of position estimation without sacrificing its performance.

For example, some embodiments utilize the Fisher information matrix to project the acquired measurements into a lower-dimensional subspace, formulating an optimization program to find the projected measurement that minimally degrades filter performance with respect to the mean squared error (MSE) of the estimate. Using the projected measurements achieves a significant computational speedup while retaining the performance of the original filter.

Another embodiment is based on the understanding that from an algorithmic standpoint, the combination of satellites does not have to include full satellites. For instance, consider the case of having four satellites. Then, it may be better to use a fourth of the measurement of the first satellite and three fourths of the fourth satellites, than to combine full satellite measurements. In other words, the combination of satellite measurements forming a measurement is a noninteger combination of satellites. Intuitively, this is because the Fisher information captures the uncertainty in the system, and although a combination of full satellites has highest probability, since there is some uncertainty about the correctness of such combination, it is safer from an MSE standpoint to choose noninteger combinations.

Accordingly, one embodiment discloses a system for tracking a state of a receiver of a global navigational satellite system (GNSS), that includes an input interface to accept motion data indicative of a change of a state of the receiver and measurements of satellite signals including a combination of carrier signals and code signals transmitted from a set of GNSS satellites, wherein a measurement for each satellite signal includes at least a single difference measurement of a satellite signal to represent a relative position of the receiver of the satellite signal with respect to a position of a satellite transmitting the satellite signal subject to integer ambiguity of the carrier signal of the satellite and noise, such that all possible measurements for each satellite signal at a current time step form a set of measurements; a memory configured to store a motion model transitioning a previous state of the receiver to a current state of the receiver according to the motion data, wherein the motion model is a probabilistic model subject to process noise, to store a measurement model relating a subset of the measurements of satellite signals to the current state of the receiver, wherein the size of the subset of measurements is less than the size of the set of measurements, and wherein the measurement model is a probabilistic model subject to measurement noise, and to store a state estimator configured to track the state of the receiver using a joint probability of the state of the receiver estimated by the motion model and the measurement model;

and a processor to track the state of the receiver, the processor is configured to select the subset of measurements by minimizing a loss of information in the subset of measurements with respect to the set of measurements; and execute the state estimator with the motion model using the motion data and the measurement model using the selected subset of measurements to estimate the state of the receiver.

Another embodiment discloses a method for tracking a state of a receiver of a global navigational satellite system (GNSS), wherein the method uses a processor coupled to a memory storing a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, wherein the processor is coupled with stored instructions implementing the method, wherein the instructions, when executed by the processor carry out steps of the method, that includes accepting motion data indicative of a change of a state of the receiver; accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements; selecting the subset of measurements minimizing a loss of information with respect to the set of measurements; and executing the state estimator with the motion model using the motion data and the measurement model using the selected subset of measurements to estimate the state of the receiver.

Yet another embodiment discloses a non-transitory computer readable storage medium embodied thereon a program executable by a processor for performing a method, wherein the medium stores a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, the method includes accepting motion data indicative of a change of a state of the receiver; accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements; selecting the subset of measurements to reduce a loss of information with respect to the set of measurements by optimizing elements of a Fisher information matrix of the set of measurements with respect to a coarse position of the receiver provided in the code signals; and executing the state estimator with the motion model using the motion data and the measurement model using the selected subset of measurements to estimate the state of the receiver.

BRIEF DESCRIPTION OF THE DRAWINGS

FIG. 1C shows the various variables that are used alone or in combination in the modeling of the motion and/or measurement model according to some embodiments.

FIG. 8B shows a schematic of probabilities of the float values of the carrier phase ambiguities sampled according to some embodiments.

DETAILED DESCRIPTION

Figure 1A:
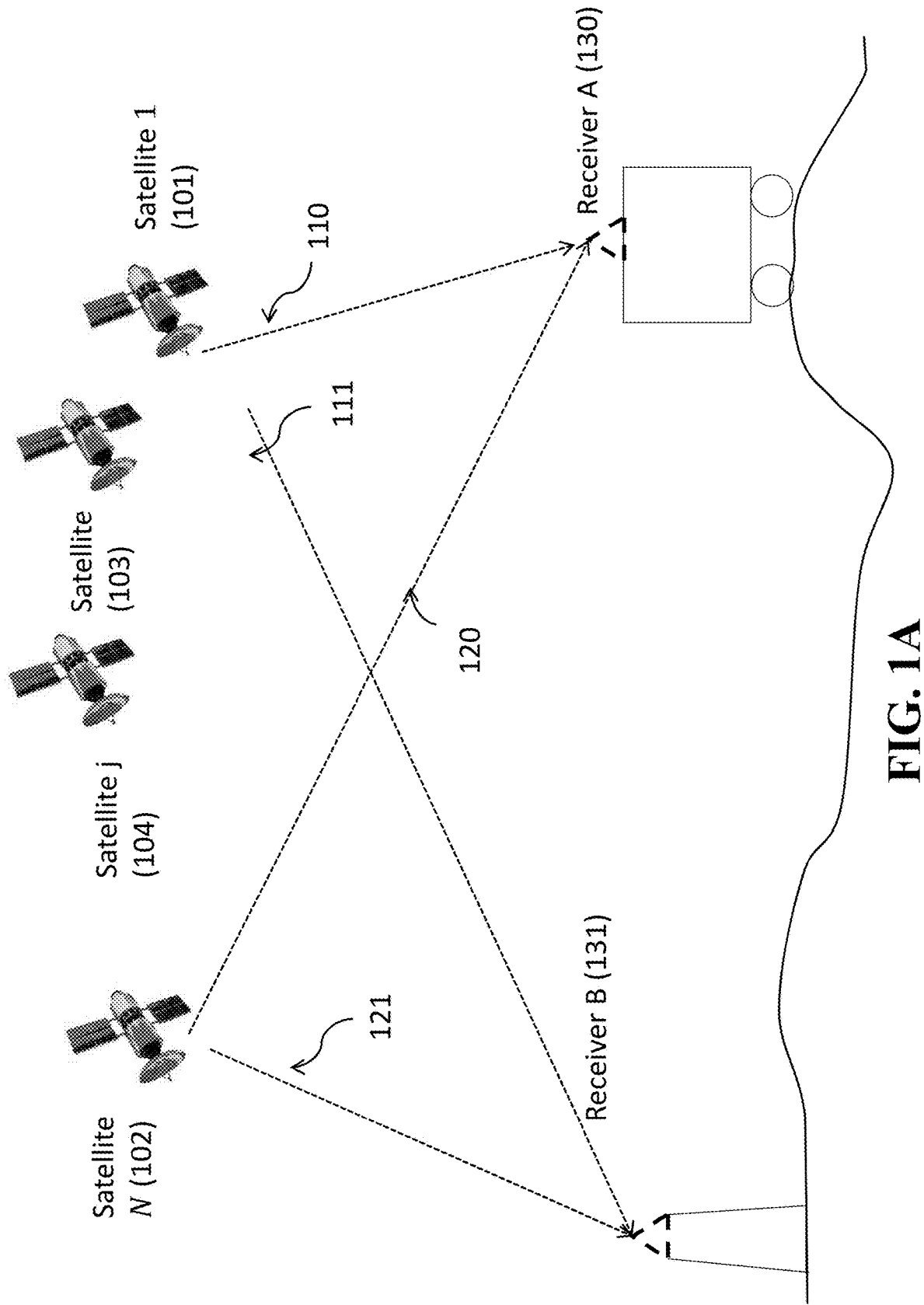
FIG. 1A shows a schematic of a global navigation satellite system (GNSS) according to some embodiments.

FIG. 1A shows a schematic of a global navigation satellite system (GNSS) according to some embodiments. For instance, the Nth satellite 102 transmits 120 and 121 code and carrier phase measurements to a set of receivers 130 and 131. For example, the receiver 130 is positioned to receive signals 110, 120, from N satellites 101, 103, 104, and 102. Similarly, the receiver 131 is positioned to receive signal 121 and 111 from the N satellites 101, 103, 104, and 102.

In various embodiments, the GNSS receiver 130 and 131 can be of different types. For example, in exemplar embodiment of FIG. 1A, the receiver 131 is a base receiver, whose position is known. For instance, the receiver 131 can be a receiver mounted on the ground. In contrast, the receiver 130 is a mobile receiver configured to move. For instance, the receiver 130 can be mounted in a cell phone, a car, or a train. In some implementations, the second receiver 131 is optional and can be used to remove uncertainties and errors due to various sources, such as atmospheric effects and errors in the internal clocks of the receivers and satellites.

It is an object of some embodiments to disclose a method for reducing complexity of the estimation procedure used for ambiguity resolution. Additionally, or alternately, it is an object of some embodiments to provide an ambiguity resolution method suitable for utilization in state estimators, such as position estimation filters, providing state estimates based on a motion model and a measurement model. The position estimation filters can be advantageous, because the ambiguity resolution is typically only an intermediate step in position estimation, not the ultimate objective.

An example of a state estimator is a Kalman filter, which uses a series of measurements observed over time, containing statistical noise and other inaccuracies, and produces estimates of unknown variables that tend to be more accurate than those based on a single measurement alone, by estimating a joint probability distribution over the variables for each timeframe. The Kalman filter keeps track of the estimated state of the system and the uncertainty of the estimate. The estimate is updated using motion model of state transitions and the measurements. Some embodiments use a Kalman filter-based system with a motion model subject to process noise of a GNSS receiver and a measurement model of satellites signals subject to measurement noise.

In some embodiments, the model of the motion of the receiver is a general-purpose kinematic constant-acceleration model with the state vector $x_k=[p_{r,k} \ v_{r,k} \ a_{r,k}]^T$, where the three components are the position, velocity, and acceleration of the receiver. In some other embodiments, the time evolution of the ambiguity is modeled as $n_{k+1}=n_k+w_{n,k}$, $w_{n,k} \sim N(0,Q_n)$, where $n_{k+1}$ is the ambiguity and $w_{n,k}$ is the Gaussian process noise with covariance $Q_n$.

Some embodiments capture the carrier and code signals in the measurement model $y_k=h_k+\lambda \bar{n}_k+e_k$, where $e_k$ is the measurement noise, h is a position estimate based on a code signal, n is the integer ambiguity having a bounded value, $\lambda$ is a wavelength of the carrier signal, and y is a single or double difference between a combination of satellites K.

Figure 1B:
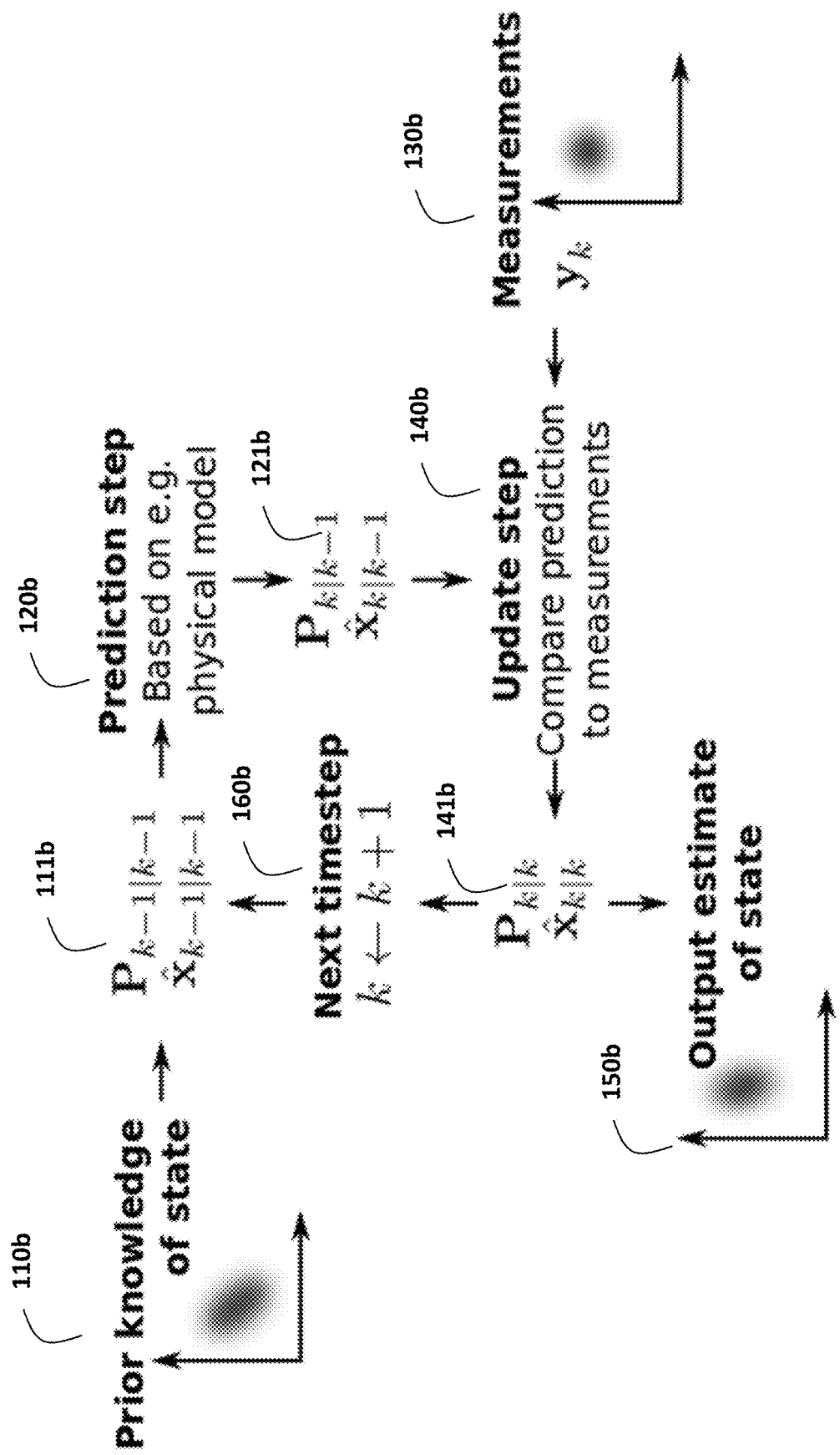
FIG. 1B shows a schematic of the Kalman filter (KF) used by some embodiments for state estimation.

FIG. 1B shows a schematic of the Kalman filter (KF) used by some embodiments for state estimation. The KF is a tool for state estimation in linear state-space models, and it is the optimal estimator when the noise sources are known and Gaussian, in which case also the state estimate is Gaussian distributed. The KF estimates the mean and variance of the Gaussian distribution, because the mean and the variance are the two required quantities, sufficient statistics, to describe the Gaussian distribution.

The KF starts with an initial knowledge 110b of the state, to determine a mean of the state and its variance 111b. The KF then predicts 120b the state and the variance to the next time step, using a model of the system, to obtain an updated mean and variance 121b of the state. The KF then uses a measurement 130b in an update step 140b using the measurement model of the system, to determine an updated mean and variance 141b of the state. An output 150b is then obtained, and the procedure is repeated for the next time step 160b.

In some embodiments, the state estimator uses the carrier phase single difference (SD) and/or double difference (DD) for estimating a state of the receiver, wherein the state includes a position of the receiver. When a carrier signal transmitted from one satellite is received by two receivers the difference between the first carrier phase and the second carrier phase is referred as the single difference (SD) in carrier phase. Alternatively, the SD can be defined as the difference between signals from two satellites reaching a receiver, wherein the first satellite is called the base satellite. For example, the difference between signal 110 from satellite 101 and signal 120 from satellite 102 is one SD signal, where satellite 101 is the base satellite. Using pairs of receivers, 131 and 130 in FIG. 1A, the difference between SDs in carrier phase obtained from the radio signals from the two satellites is called the double difference (DD) in carrier phase. When the carrier phase difference is converted into the number of wave length, for example, $\lambda$=19 cm for L1 GPS (and/or GNSS) signal, it is separated by fractional and integer parts. The fractional part can be measured by the positioning apparatus, whereas the positioning device is not able to measure the integer part directly. Thus, the integer part is referred to as integer bias or integer ambiguity.

In general, a GNSS can use multiple constellations at the same time to determine the receiver state. For example, GPS, Galileo, Glonass, and QZSS can be used concurrently. Satellite systems typically transmit information at up to three different frequency bands, and for each frequency band, each satellite transmits a code measurement and a carrier-phase measurement. These measurements can be combined as either single differenced or double differenced, wherein a single difference includes taking the difference between a reference satellite and other satellites, and wherein double differencing includes differencing also between the receiver of interest and a base receiver with known static location.

FIG. 1C shows the various variables that are used alone or in combination in the modeling of the motion and/or measurement model according to some embodiments. Some embodiments model the carrier and code signals for each frequency with the measurement model $$P_k^j = \rho_k^j + c(\delta t_{r,k} - \delta t_k^j) + I_k^j + T_k^j + \varepsilon_k^j, \quad (1)$$

$$\Phi_k^j = \rho_k^j + c(\delta t_{r,k} - \delta t_k^j) - I_k^j + T_k^j + \lambda n_k^j + \eta_k^j, \quad (2)$$

where $P^j$ is the code measurement $\rho^j$ is the distance between the receiver and the jth satellite, c is the speed of light, $\delta t_r$ is the receiver clock bias, $\delta t^j$ is the satellite clock bias, $I^j$ is the ionospheric delay, $T^j$ is the tropospheric delay, $\varepsilon^j$ is the probabilistic code observation noise, $\Phi^j$ is the carrier-phase observation, $\lambda$ is the carrier wavelength, $n^j$ is the ambiguity, and qi is the probabilistic carrier observation noise.

By utilizing a base receiver b mounted at a known location broadcasting to the original receiver r, most of the sources of error can be removed. For instance, one embodiment forms the difference between the two receivers 130 and 131 in FIG. 1A as $\Delta P_{br,k}^j = P_{b,k}^j - P_{r,k}^j$ and $\Delta \Phi_{br,k}^j = \Phi_{b,k}^j - \Phi_{r,k}^j$, from which the error due to the satellite clock bias can be eliminated. Another embodiment forms a double difference between two satellites j and l. Doing in such a manner, clock error terms due to the receiver can be removed. Furthermore, for short distances between the two receivers (e.g., 30 km), the ionospheric errors can be ignored, leading to $\nabla \Delta P_{br,k}^{jl} \approx \nabla \Delta \rho_{br,k}^{jl} + \nabla \Delta \varepsilon_{br,k}^{jl}$, $\nabla \Delta \Phi_{br,k}^{jl} \approx \nabla \Delta \rho_{br,k}^{jl} + \lambda \nabla \Delta n_{br}^{jl} + \nabla \Delta \eta_{br,k}^{jl}$. Alternatively, one embodiment forms the difference between two satellites 101 and 102, leading to SD measurements.

Figure 1D:
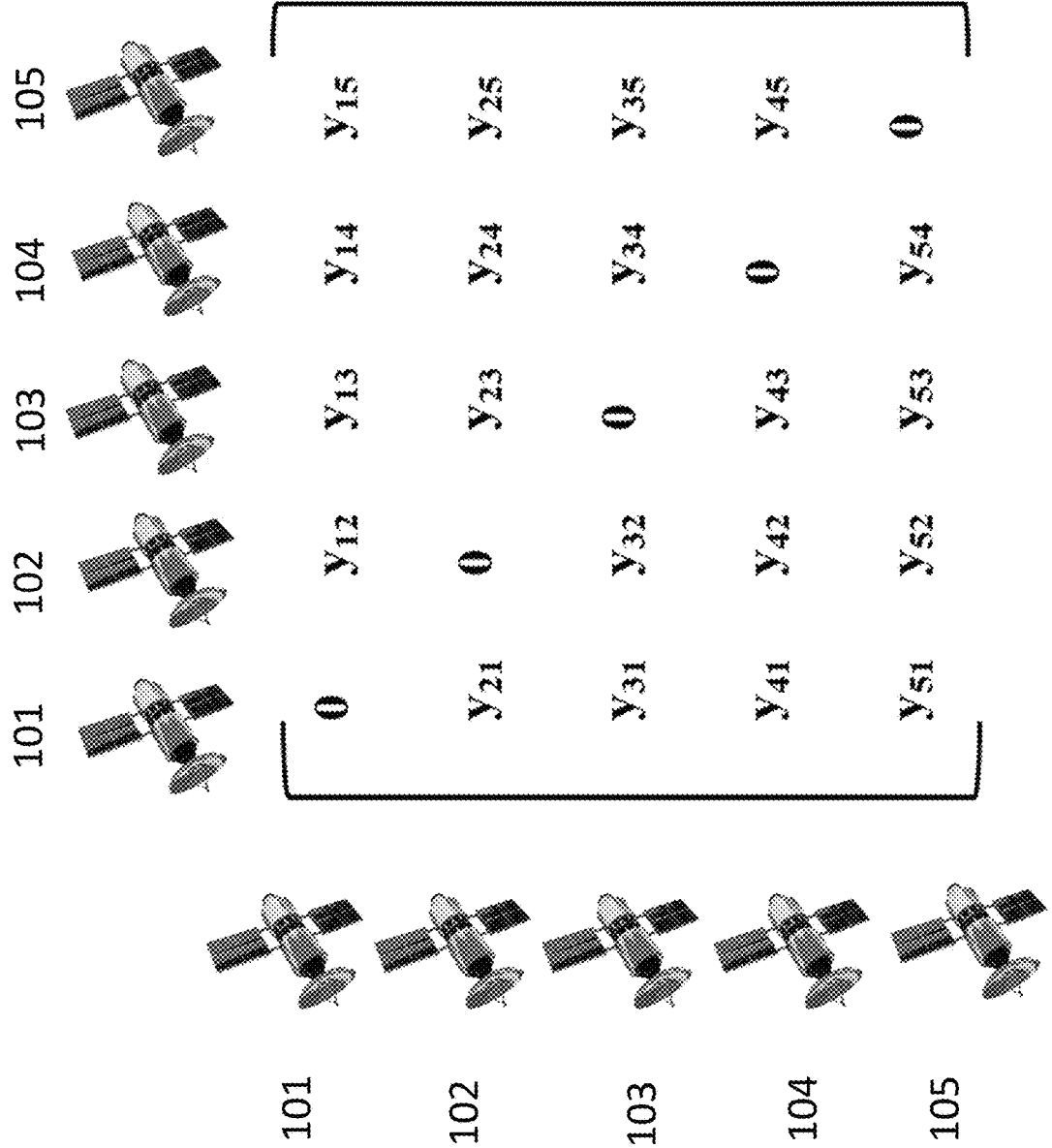
FIG. 1D shows an example of the combinations of SD that can be formed for one frequency between satellites when there are five satellites in line-of-sight (LOS).

For satellites shown in FIG. 1A, the SD and DD can be formed between any combination of satellites. FIG. 1D shows an example of the combinations of SD that can be formed for one frequency between satellites when there are five satellites in line-of-sight (LOS). The measurements of different combinations of satellites can be represented as the matrix in FIG. 1D, referred herein as a measurement matrix. Each element of the measurement matrix is an SD or DD measurement of at least one unique pair of satellites. Different satellites can be grouped in different pairs to increase dimensionality of the measurement matrix. Each measurement $y_{ij}$ carries information that can be used for position estimation. To that end, it can be possible to use the measurement matrix in its entirety for position estimation. For example, using the satellite 101 as base receiver, SD measurements $y_{12}$, $y_{13}$, $y_{14}$, and $y_{15}$ can be formed. Similarly, using satellite 102 as base satellite, the corresponding SDs are $y_{21}$, $y_{23}$, $y_{24}$, and $y_{25}$. Generally, for T satellites and N frequencies there are (M−1)NM/2 possible combinations.

Some embodiments recognize that using all measurements of the measurement matrix can be computationally prohibitive for computationally limited receivers. In other words, in some situations, the dimensionality of the measurement matrix caused by availability of LOS satellites for the tracked GNSS receiver prohibitively increases computational complexity of position estimation filters. For instance, if there are multiple integer ambiguities that give good state estimation, it can be advantageous to execute multiple state estimators. As illustration, assume that there are M=10 unique pairs of code and carrier phase measurements, with five possible ambiguities that give good state estimation. This requires $N_S = 5^M \approx 10^7$ state estimators to be executed in parallel. Hence, the computations can be overwhelming for a low-cost receiver.

Some embodiments are based on recognition that different elements of measurement matrix can have different informational value to the position estimation filter. For example, a pair of satellite positions on the same LOS with respect to the GNSS receiver has less informative value than a pair of satellites positioned on different LOS. This is because they provide the same geometric information of the receiver.

Figure 1E:
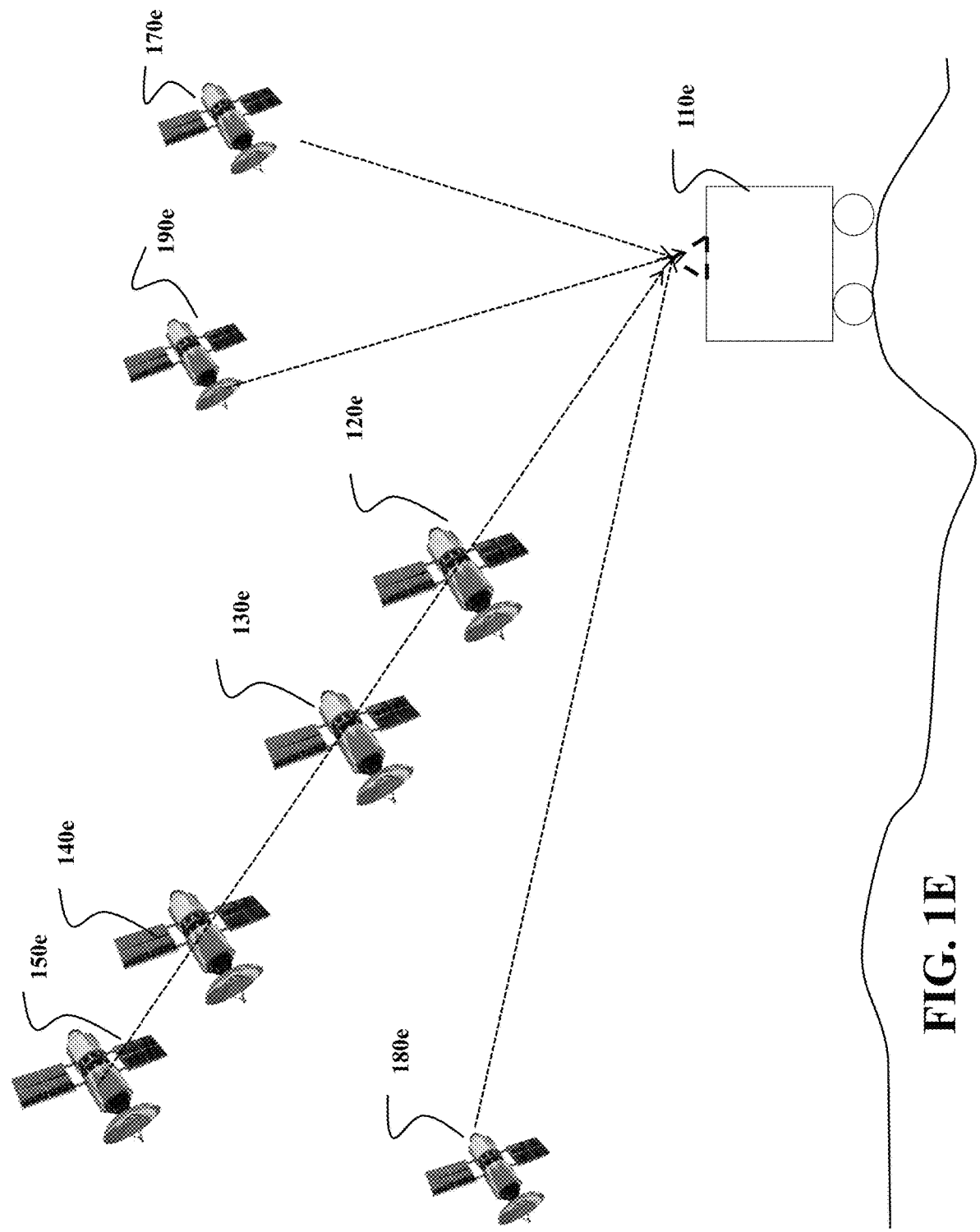
FIG. 1E shows an example of recognitions of different embodiments of the invention.

FIG. 1E shows a schematic illustrating a recognition of different embodiments that different measurements forming the measurement matrix can carry different amount of information. The figure shows a receiver 110e and seven satellites 120e through 190e. Assume that four satellites are to be used in the state estimator, e.g., a KF. Satellites 120e, 130e, 140e, and 150e are located on the same line from the receiver 110e. They provide different distance measurements but from the same elevation angle, meaning that they have equal sensitivity to measurement noise. i.e., noise in the position measurement of the receiver. However, satellites 170e, 180e, and 190e have different elevation angles, meaning that measurement noise affects the uncertainties of receiver position differently. Hence, different satellites provide different information about the receiver position.

Figure 1F:
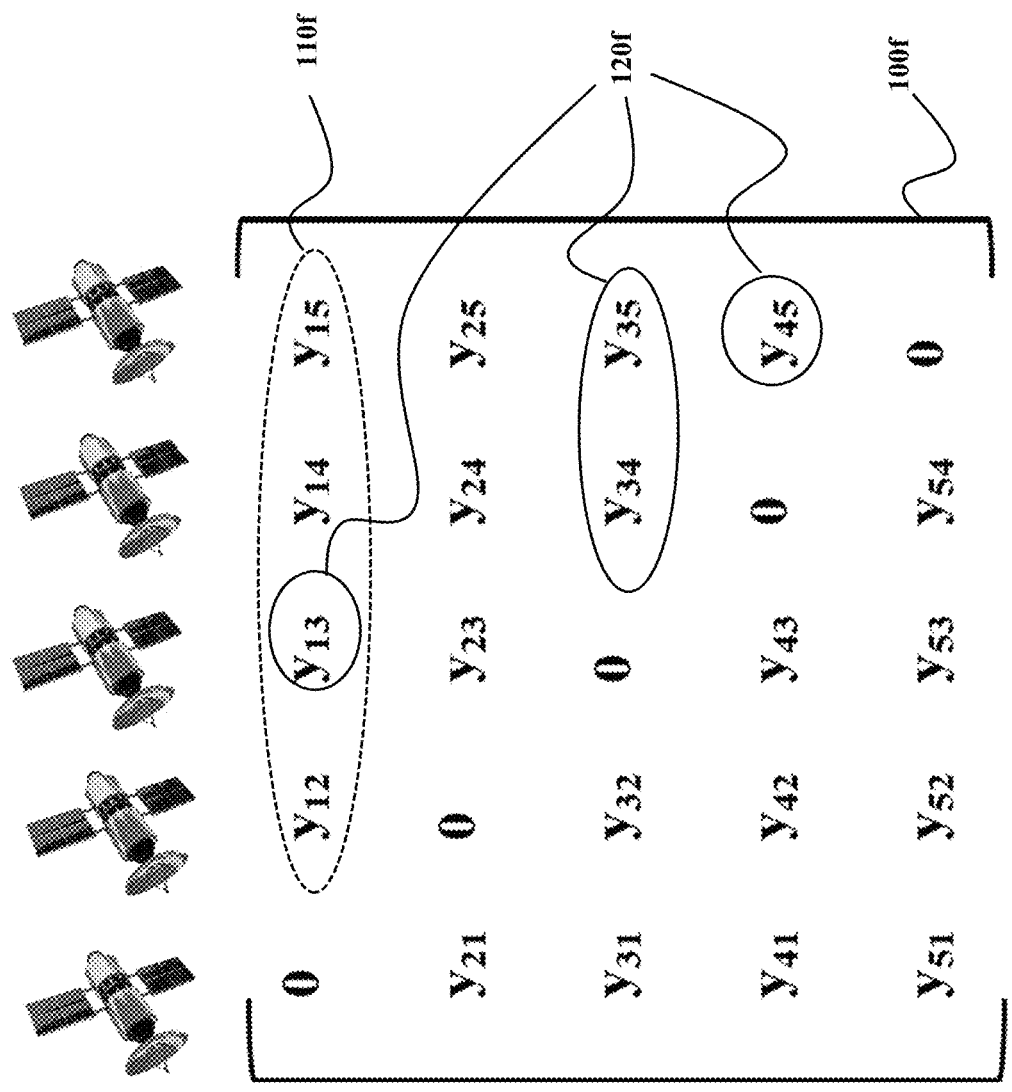
FIG. 1F shows an illustration of conventional selection of measurements according to one embodiment.

For example, in GNSS, the base satellite to use in the SD is the satellite with the highest elevation angle, because that satellite is likely to not have obstructions from multipath. Referring to FIG. 1F, if satellite 101 has the highest elevation angle, this means that the set 110f of measurements $y_{12}$, $y_{13}$, $y_{14}$, and $y_{15}$ are the measurements selected from the measurement matrix 100f to be used in the estimation. However, some embodiments are based on the understanding that there are multiple factors determining which satellite to use as base satellite, e.g., the physical positions and environmental disturbances of the satellites. Referring again to FIG. 1E, satellite 190e has the highest elevation angle of all the satellites. Hence, it is natural to form the SD as the difference between 190e and the other satellites and choose four SD measurements to use in the state estimator. However, instead it can be advantageous to form SD measurements using different satellites as base satellites, because it provides more geometric diversity among satellites.

Some embodiments are based on the realization that it is possible to select a predetermined number of measurements with maximum total information about the position. Because the number of selected measurements is predetermined from computational point of view, but the measurements are selected from available measurements based on informative value point of view, the selected combination provides maximum accuracy of state estimation while obeying the computational limitations of the receiver hardware. For example, instead of selecting measurements 110f, some embodiments select the subset of measurements 120f minimizing a loss of information with respect to the set of measurements. For example, the information is a cost function of the measurements used to estimate the position of the GNSS receiver. Hence, the loss of information is a difference between the cost function of having all measurements of the measurement matrix 100f as an input and the cost function of having the subset of measurements, e.g., subset 110f or 120f, as the input measurements.

The position of the receiver is part of the state of the receiver, which is unknown and estimated by the state estimator, e.g., a KF. A state estimator by nature produces a small error in position information. To that end, some embodiments are based on that the recognition that to determine the information of measurements, it is enough to know a coarse position of the receiver.

Figure 1G:
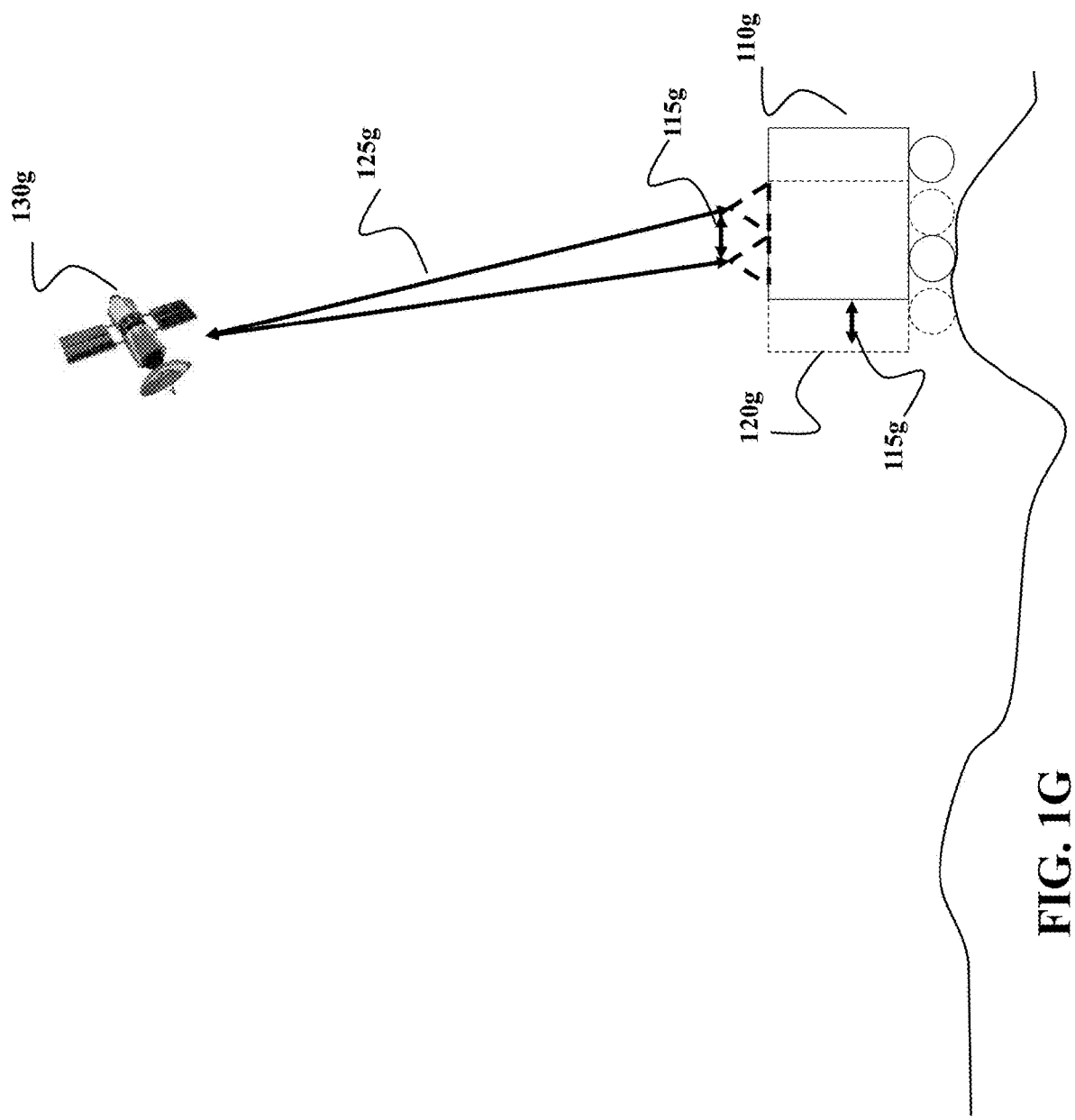
FIG. 1G shows an illustration of a recognition of one embodiment of using coarse position of receiver to determine the information of measurement of a satellite

FIG. 1G shows an illustration of a recognition of one embodiment of using coarse position of receiver to determine the information of measurement of a satellite 130g.

The receiver is located at position 110g, but the measurements result in a position estimation error of 115g, implying that the state estimator believes that the receiver is located at position 120g. However, this error is substantially smaller than the distance 125g between the receiver 110g and satellite 130g. Hence, the determining of the information of measurements using satellite 130g is insensitive to the use of a coarse knowledge of the actual position of the receiver. This is advantageous, because the coarse position in a GNSS system can be estimated from the code signals without using phases of the carrier signals. For instance, the estimation of a coarse position can be done using a least-squares solution of at least one of the code signals, or it can be done by optimizing over a set of code signals collected during several epochs.

For example, in one embodiment, the cost function is a function of the Fisher information matrix of the input measurements. This is advantageous for probabilistic position estimation filters, such as a Kalman filter, because the Fisher information measures the amount of information probabilistically, i.e., as an observable random variable X carries about an unknown parameter θ of a distribution that models X. To that end, in some embodiments, to select the subset of measurements, the embodiments optimize elements of the Fisher information matrix of the set of measurements with respect to a coarse position of the receiver provided in the code signals. For example, by optimizing the elements of the Fisher information matrix, the optimization procedure returns the subset of measurements minimizing the variance of the coarse position of the receiver with resolution defined by the code signals.

Figure 2A:
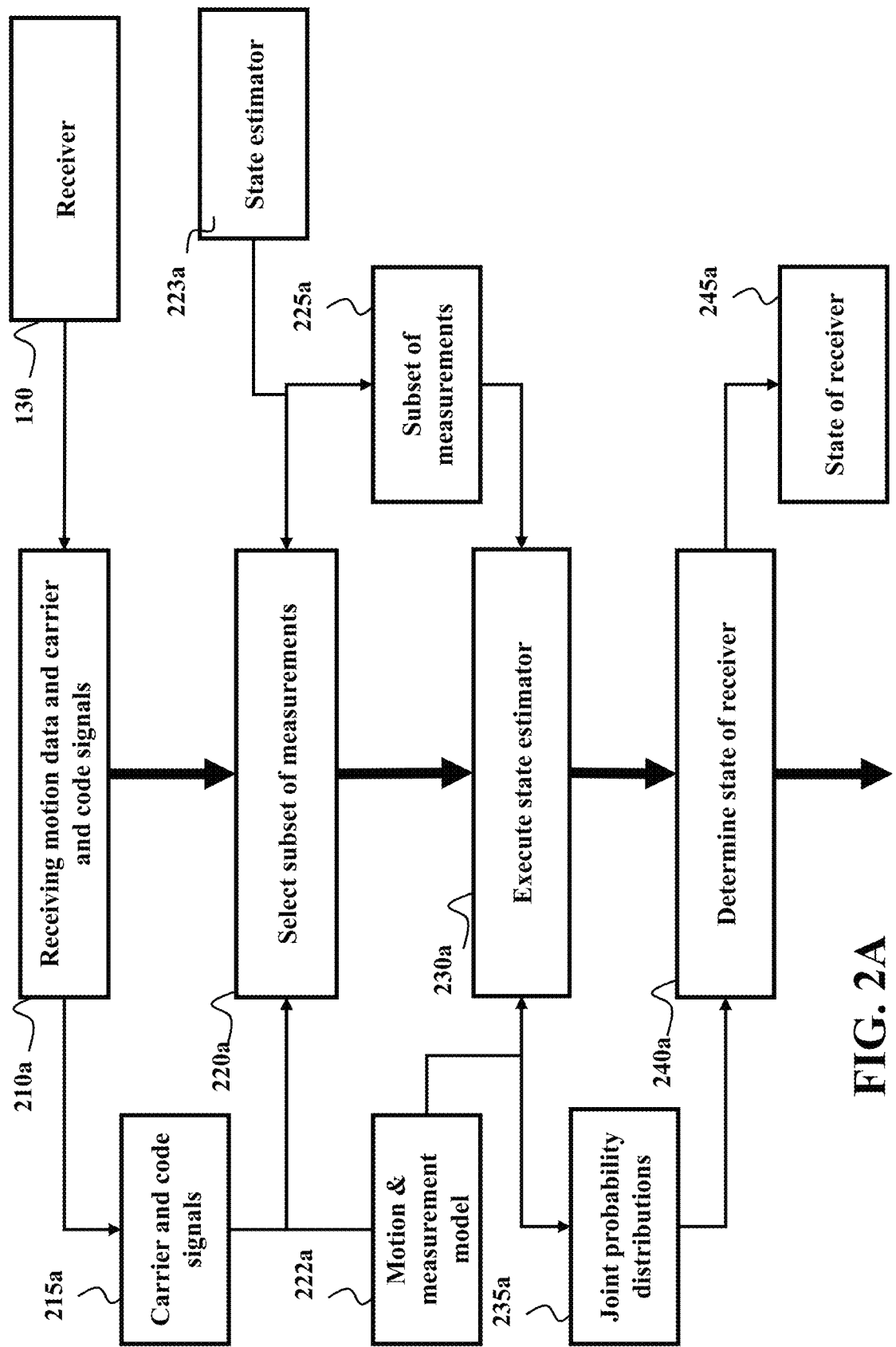
FIG. 2A shows a flowchart of one iteration of a method for tracking a state of a, possibly moving, receiver.

FIG. 2A shows a flowchart of one iteration of a method for tracking a state of a, possibly moving, receiver 130 using a GNSS configured to receive 210a motion data and measurements of satellite signals including a combination of carrier signals and code signals transmitted from a set of GNSS satellites 101, 102, 103, 104 according to some embodiments. As also used herein, such a receiver 130 is a GNSS receiver. Each measurement for each satellite signal includes a single and/or a double difference between the satellite signal transmitted by a satellite and another satellite signal to include a relative position of the receiver of the satellite signal with respect to a position of the satellite, wherein each carrier signal includes a carrier phase ambiguity as an unknown integer number of wavelengths of the carrier signal travelled between the satellite 101, 102, 103, or 104 and the receiver 130 and noise, such that all possible measurements for each satellite signal form a set of measurements.

The method retrieves 222a from a memory a probabilistic motion model subject to process noise relating a previous state of the receiver to a current state of the receiver and a probabilistic measurement model subject to measurement noise relating a subset of the measurements of measurements 215a of the satellite signals to the current state of the receiver using the carrier phase ambiguities of the carrier signals. The maximum size of the subset of measurements is predetermined and fixed. The method also retrieves 223a an estimator configured to track the state of the receiver using a joint probability of the state of the receiver estimated by the motion model and the measurement model.

Next, the method selects 220a a predetermined number of measurements 225a and executes 230a the state estimator with the motion model 222a using the motion data, the previous state of the receiver, and the measurement model 222a using the selected subset 225a of measurements, to determine a joint probability distribution 235a of the state of the receiver using the motion model and measurement model, and determine 240a the state of the receiver 245a from the joint distribution 235a. In various embodiments, the method selects 220a the subset of measurements 225a minimizing a loss of information with respect to the set of measurements 215a.

Figure 2B:
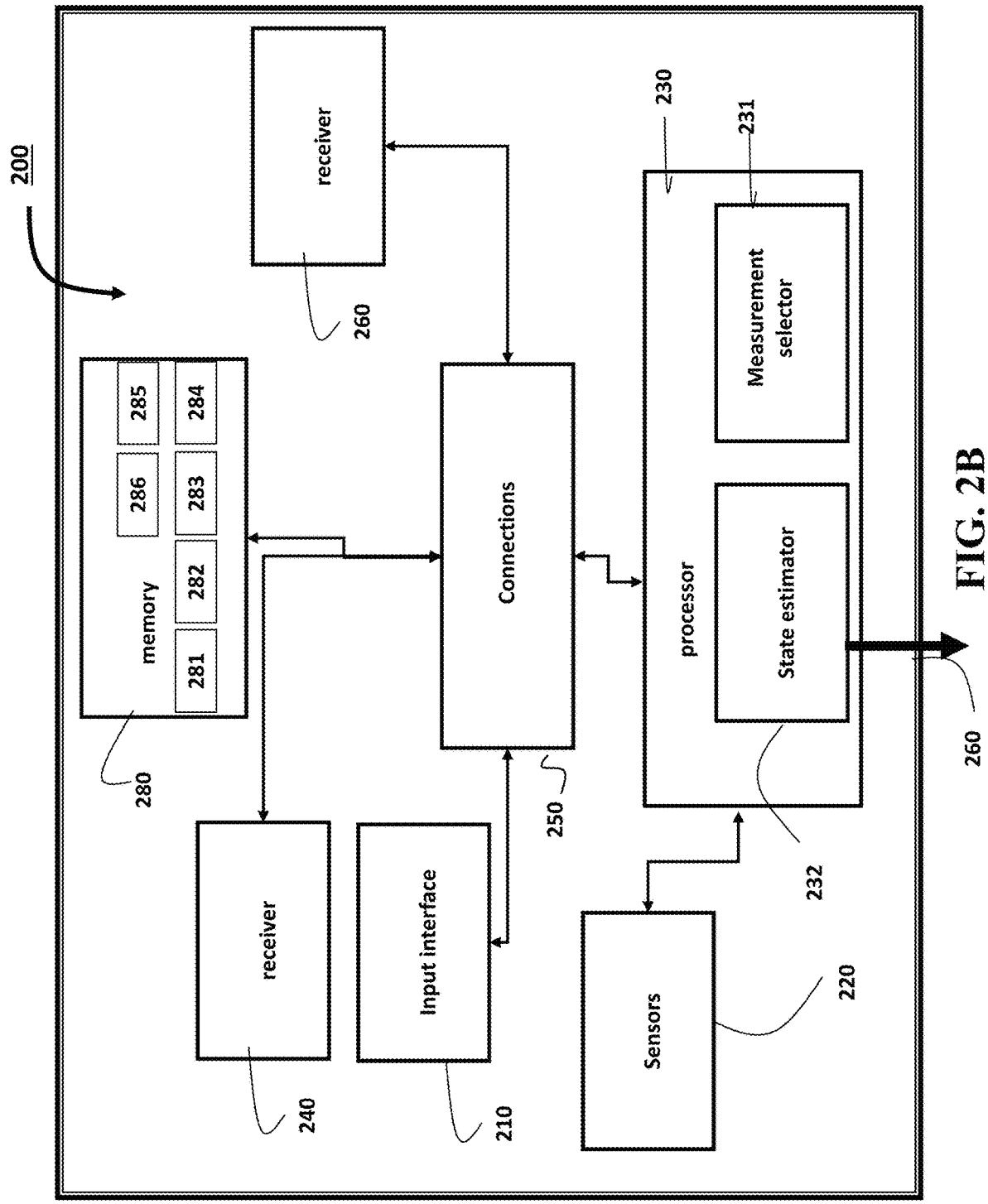
FIG. 2B shows a block diagram of a system for tracking of a state of a receiver of a GNSS according to some embodiments.

FIG. 2B shows a block diagram of a system 200 for tracking of a state of a GNSS receiver according to some embodiments. The state estimation system 200 includes an input interface 210 to accept motion data indicative of a change of a state of the receiver and measurements of satellite signals, i.e., carrier signals and code signals transmitted from a set of GNSS satellites, each carrier signal includes a carrier phase ambiguity as an unknown integer number of wavelengths of the carrier signal travelled between the satellite and the receiver, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements. The system 200 can be implemented internal to a number of devices on which the receiver 240 is located, such as handheld devices, cars, airplanes, or trains. Additionally, or alternatively, the system 200 can be communicatively connected to the device, i.e., the receiver 240 is not physically inside the system.

The system also includes a memory 280 storing a motion model 281 relating a previous state of the receiver to a current state of the receiver, wherein the motion model is subject to process noise, and a measurement model 282 relating measurements of the carrier and code signals received by the receiver 240 to the current state of the receiver using the carrier phase ambiguities of the carrier signals, wherein the measurement model relate a subset of the measurements of satellite signals to the current state of the receiver, wherein the maximum size of the subset of measurements is predetermined and fixed, and wherein the measurement model is a probabilistic model subject to measurement noise. Due to the inherent random noise and errors of the satellite transmitter and receiver 210, the motion model and the measurement model are probabilistic, thus allowing several possible values of the carrier phase ambiguity at any given epoch to be consistent with those models with different probabilities. The memory 280 can also store 284a set of possible combinations of integer values described by other embodiments.

The system 200 can include additional sensors 220 that can help in aiding the positioning system. For instance, the sensors 220 can include an inertial measurement unit (IMU), a camera, wheel encoders if mounted in a wheeled vehicle, a laser. For example, when connected to a car, the IMU and wheel encoders can be used in a motion model of the vehicle to increase accuracy of the positioning system beyond what otherwise would be possible.

The system 200 includes a processor 230 for tracking the state of the receiver using a state estimator 285. Further, the processor 230 is configured to select 231 a subset of measurements with respect to the set of measurements. Also, the processor 230 is configured to execute and/or run a at least one state estimator 232 determining states of the receiver 210 by jointly using the motion model 281 and the measurement model 282. Each state estimator determines a joint probability distribution of the state of the receiver 210 with respect to the motion model 281 and the measurement model 282 and can be executed by the processor 230 concurrently and/or sequentially with other state estimators. Using a multiple of state estimators can be useful, e.g., when there is multiple hypothesis of integer ambiguity that are to be explored for correctness, which is covered by other embodiments of the invention.

Alternatively, or additionally, the measurement models of at least some different state estimators 232 include different combinations 231 of integer values of the carrier phase ambiguities selected from the set of possible combinations. For example, each state estimator 232 uses a measurement model 282 with its corresponding and unique combination of integer values of the carrier phase ambiguities selected from the integer combinations 231. Next, the processor determines 260 the state of the receiver using a state estimator with the highest joint probability of the position of the receiver according to the measurements of the carrier and the code signals. In such a manner, the estimation of the carrier phase ambiguities is moved outside of the state estimator 232, which is advantageous because allows linear position estimators to work with non-linear change of the carrier phase ambiguities.

The IMU can include 3-axis accelerometer(s), 3-axis gyroscope(s), and/or magnetometer(s). The IMU can provide velocity, orientation, and/or other position related information to the processor 230. In some embodiments, the IMU can output measured information in synchronization with the capture of each image frame from a camera. In some embodiments, the output of the IMU is used in part by the processor 230 to fuse the sensor measurements and/or to further process the fused measurements.

The system 200 can include a transmitter 250 enabled to transmit one or more signals. For instance, the transmitter 250 can send the state of the receiver 240 to other estimation methods, to be used in fusion with other sensors to improve accuracy. The receiver 240 and transmitter 250 can receive and transmit over one or more types of wireless communication networks. The receiver 240 and transmitter 250 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 200 can also include one or more ports for communicating over wired networks, such as the controller area network (CAN) bus.

The memory 280 can store 286 carrier phase measurements, as well as data provided by the sensors 220. For example, in some implementations, the memory 280 stores a geometry of the physical construction on which the receiver is mounted 284, and a geometrical relationship between the satellites and the receivers 283. In general, the memory 280 can represent any data storage mechanism. The memory 280 can include, for example, a primary memory and/or a secondary memory. The primary memory can include, for example, a random access memory, read only memory, etc. While illustrated in FIG. 2B as being separate from the processors 230, it should be understood that all or part of a primary memory can be provided within or otherwise co-located and/or coupled to the processors 230.

The different components in the system 200 can be operatively coupled to other each other through connections 250. The connections 250 can comprise buses, lines, fibers, links or combination thereof.

The processor 230 can be implemented using a combination of hardware, firmware, and software. The processor 230 can represent one or more circuits configurable to perform at least a portion of a computing procedure or process related to sensor fusion and/or methods for further processing the fused measurements. The processor 230 retrieves instructions and/or data from memory 280. The processor 230 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

Figure 2C:
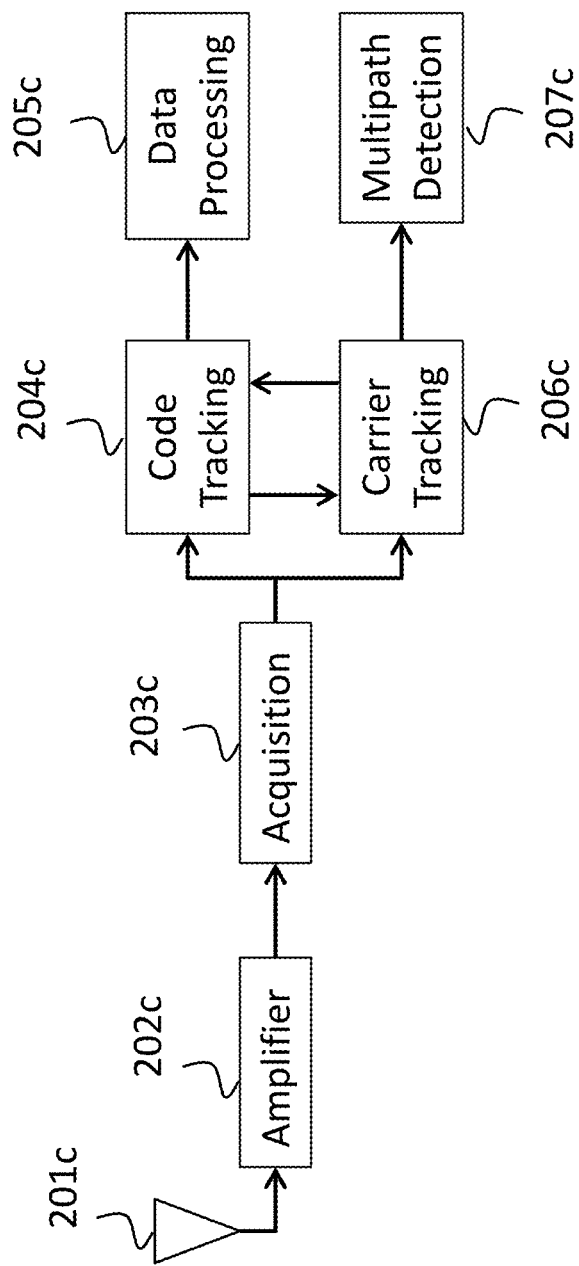
FIG. 2C shows a block diagram of a receiver used by some embodiments.

FIG. 2C shows a block diagram of a receiver used by some embodiments. In those embodiments, the measurements to detect the presence of multipath 207c are natively computed in the receiver as part of the process by which position is estimated. After the antenna 201c, and before acquisition 203c, the received signal is made up of the sum of the signals emitted by each satellite. An amplifier 202c is designed to strengthen the signal for further processing. The acquisition 203c initializes the tracking process by supplying estimates for the phase and frequency of each received satellite signal. The tracking unit is tasked with estimating and providing measurements of the phase and frequency of each satellite signal over time for the carrier wave 206c and for code tracking 204c. The code tracking 204c is used to determine and process 205c the data messages. The carrier wave tracking 206c is used to determine the multipath 207c.

Some GNSS receivers can have several antennae for a single receiver, but combinations of several antennae with as many receivers are conceivable. One embodiment uses multiple antennae with as many receivers as antennae. The antennae are spatially separated, which allows the receivers to detect differences between the observed carrier frequencies on the same satellite signal.

Some embodiments are based on the knowledge that determining which SD measurements to use in the state estimation can be done by means of optimization. Specifically, one embodiment is based on the fact that using the position of the satellites and the position of the receiver, it is possible to quantify the information available in each SD measurement in the measurement matrix in FIG. 1D. Based on the quantification of the information of each SD measurement, the combination of satellites minimizing the loss of information subject to a predetermined maximum number of satellites can be determined by optimizing a cost function of measurements, such that the loss of information is a difference between the cost function of having the set of measurements as the measurements and the cost function of having the subset of measurements as the measurements.

Figure 3A:
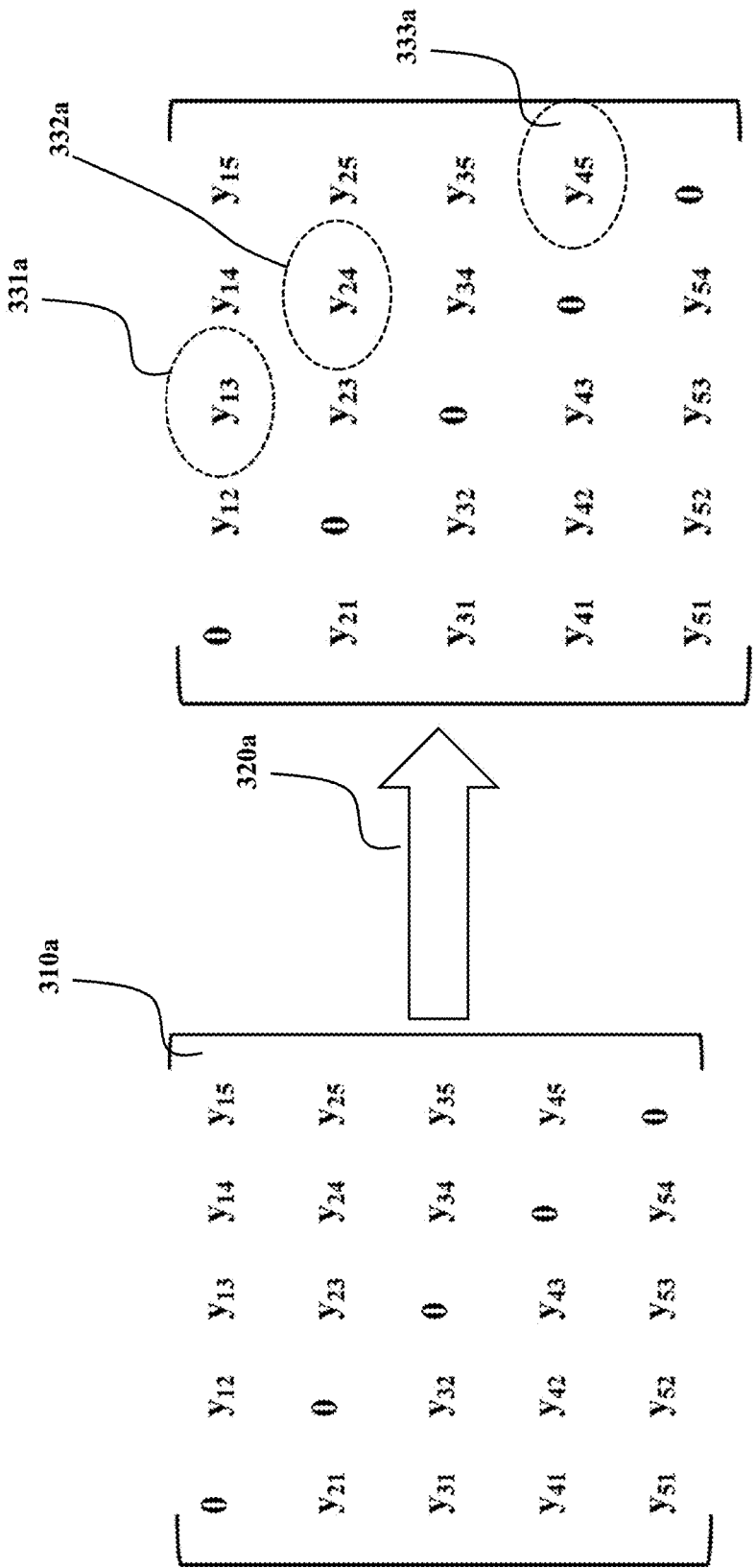
FIG. 3A illustrates the result from an optimization procedure for minimizing the loss of information of a subset of measurements with respect to the set of measurements according to one embodiment.

FIG. 3A illustrates the result from an optimization procedure for minimizing the loss of information of a subset of measurements with respect to the set of measurements according to one embodiment. The full measurement matrix 310a consisting of 10 unique measurements. In this example, based on a maximum number of measurements set to 3, minimizing 320a the loss of information results in measurements 331a, 332a, and 333a selected as the best measurements to use.

One embodiment realized that it is possible to quantify the information of measurements in probabilistic manner by the use of the Fisher information. The Fisher information is a way of measuring the amount of information that an observable random variable carries about an unknown parameter of a distribution that models the variable.

Some embodiments utilize the Fisher information matrix (FIM) to project the acquired measurements into a lower-dimensional subspace, formulating an optimization program to find the projected measurement that minimally degrades estimator performance with respect to the mean squared error (MSE) of the estimate. Using the projected measurements achieves a significant computational speedup while retaining the performance of the original estimator.

In one embodiment, the probabilistic measurement model is expressed as a Gaussian probability density function $p(y;\theta)=\mathcal{N}(y;h_p(\theta), R)$, wherein $h_p$ is the deterministic part of the measurement model relating the position of the receiver to the measurement, $\theta$ is the position of the receiver expressed as a parameter, and R is the covariance of the measurement noise. For any unbiased estimate $\hat{\theta}$ of $\theta$, the FIM $\mathcal{I}(y;\theta)$ lower-bounds the variance of the estimation error according to $\mathbb{E}[\|\theta-\hat{\theta}\|_2^2]=\text{Tr}(\mathbb{E}[(\theta-\hat{\theta})(\theta-\hat{\theta})^T])\geq \text{Tr}(\mathcal{I}(y;\theta)^{-1})$. That is, the FIM gives a lower bound on how small the variation of the position estimate around the true position can be. The lower bound, i.e., the trace of the inverse of the FIM is denoted by the Cramer-Rao bound (CRB).

Accordingly, one embodiment minimizes the trace of the inverse of the FIM, $\text{Tr}(\mathcal{I}(y;\theta)^{-1})$, since it maximizes the information of the subset of measurements. This gives rise to a reduced FIM, which is the FLM of the reduced set of measurements, i.e., subset of measurements.

Some embodiments constrain the maximum number of measurements to a number $\tilde{M}\leq 2M$ wherein M is the number of unique SD or DD carrier/code signals.

One embodiment is based on the understanding that to find the subset of measurements is the equivalent problem of finding a projection from the original set of measurements $y_k$ to a projected set of measurements, i.e., a subset of measurements $\tilde{y}_k$. One embodiment uses a projection operator $\Psi_k:\mathbb{R}\rightarrow\mathbb{R}^{\tilde{M}}$ according to $\tilde{y}_k=\Psi_k(y_k)$, such that a maximal amount of information is retained in the projected measurements, i.e., the projection operator is chosen such that it minimizes the loss of information of the reduced FIM compared to the FIM using the full set of measurements.

Figure 4A:
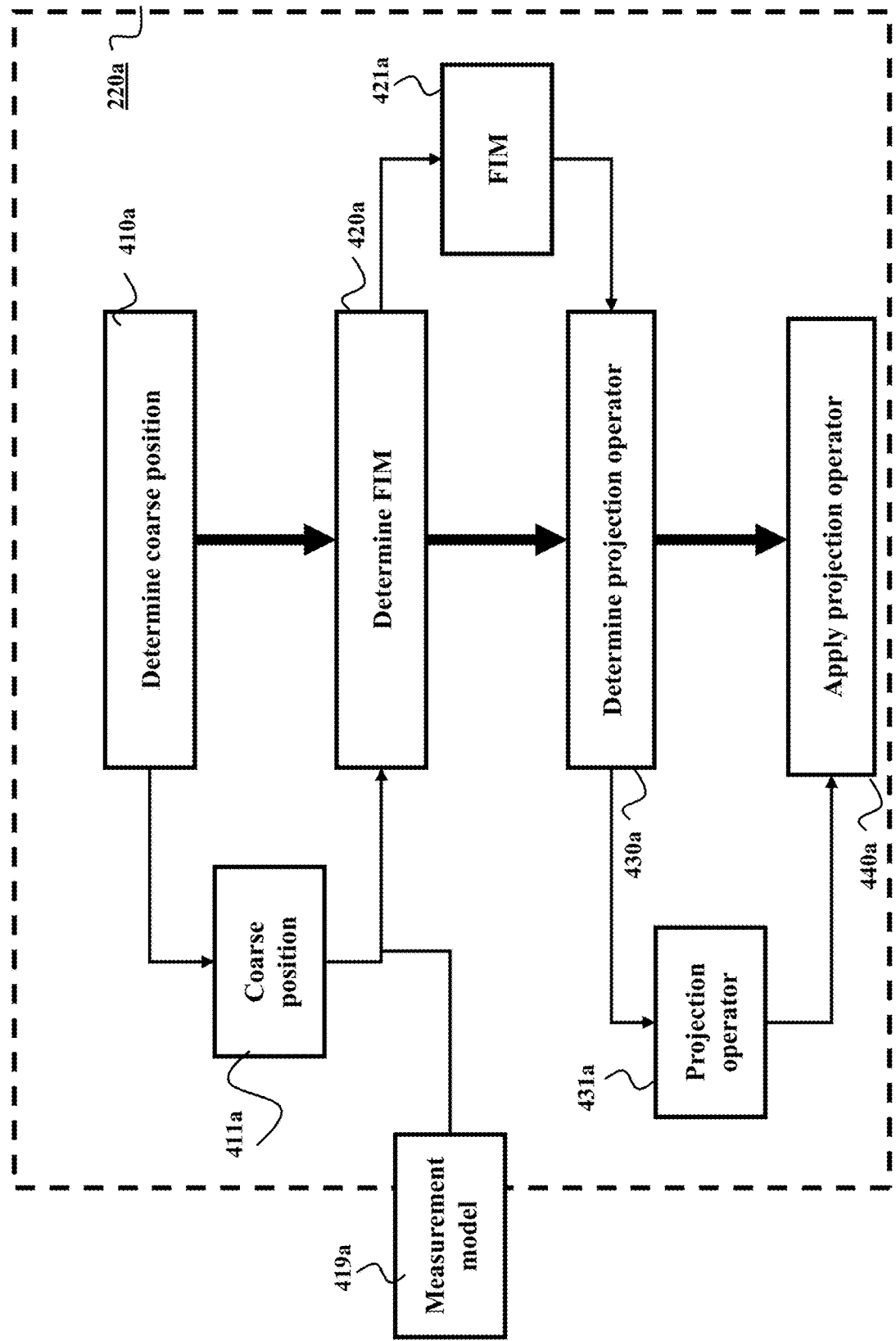
FIG. 4A shows a flowchart of a method for selecting the subset of measurements according to one embodiment.

FIG. 4A shows a flowchart of a method 220a for selecting the subset of measurements according to one embodiment, wherein the method is executed by a processor. First, the method determines 410a a coarse position 411a of the receiver corresponding to at least one code signal. For instance, in one implementation the coarse position is determined by optimizing the fit of the coarse position to the code signals, e.g., by solving a least-squares problem. Using the coarse position 411a and the measurement model 419a, the method determines 420a the FIM 421a by inserting the coarse position into the measurement model. Next, the method determines 430a a projection operator 431a that reduces the FIM to a reduced FIM, i.e., an FIM of the subset of measurements with the size of the subset of measurements, by minimizing the loss of information in the reduced FIM with respect to the FIM of the full set of measurements. Finally, the method applies 440a the projection operator to the full measurement matrix to produce the subset of measurements.

Figure 4B:
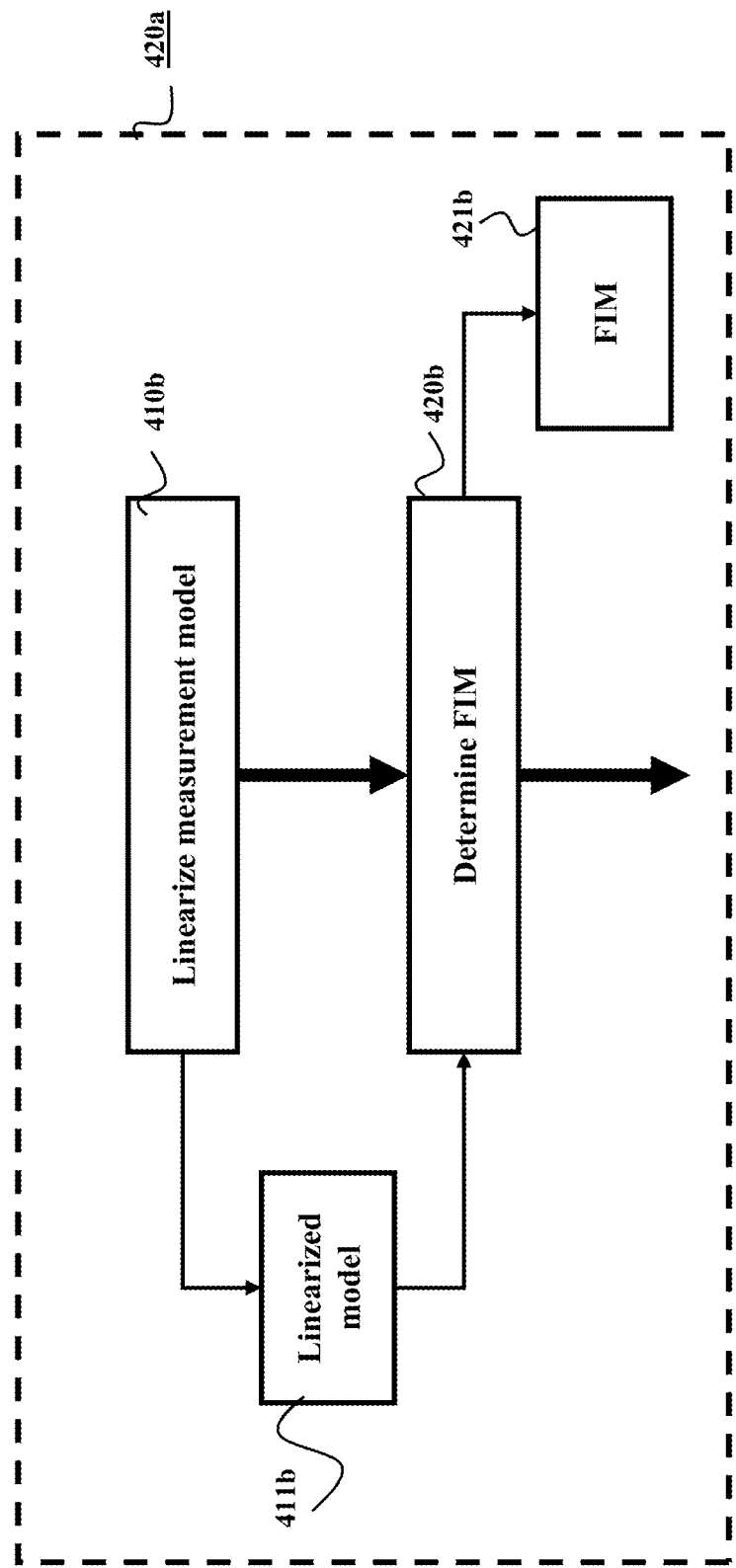
FIG. 4B shows a flowchart of one iteration of a method for selecting the subset of measurements according to some embodiments.

FIG. 4B shows an implementation of a method 420a for the determining a reduced an FIM according to one embodiment. In general $h_p$, i.e., the deterministic part of the measurement model relating the position of the receiver to the measurement, is nonlinear due to the distance calculation involved between receiver and satellites. In one embodiment, the method linearizes 410b the nonlinear measurement model around the coarse position. Next, using the linearized model 411b $$H_p = \frac{\partial h_p(\theta)}{\partial \theta}\bigg|_{\theta=p^*},$$

the method determines 420b the FIM 421b as a function of the projection operator $\Psi_k: \mathbb{R}\rightarrow\mathbb{R}^{\tilde{M}}$, $\mathcal{I}(\tilde{y};\theta)=(\Psi H_p)^T(\Psi R\Psi^T)^{-1}\Psi H_p$.

Some embodiments are based on the understanding that the minimization of the CRB is a nonconvex optimization problem, where numerical methods are necessary. In one embodiment the determining the projection operator that optimizes the CRB is implemented iteratively until a termination condition is met.

Figure 4C:
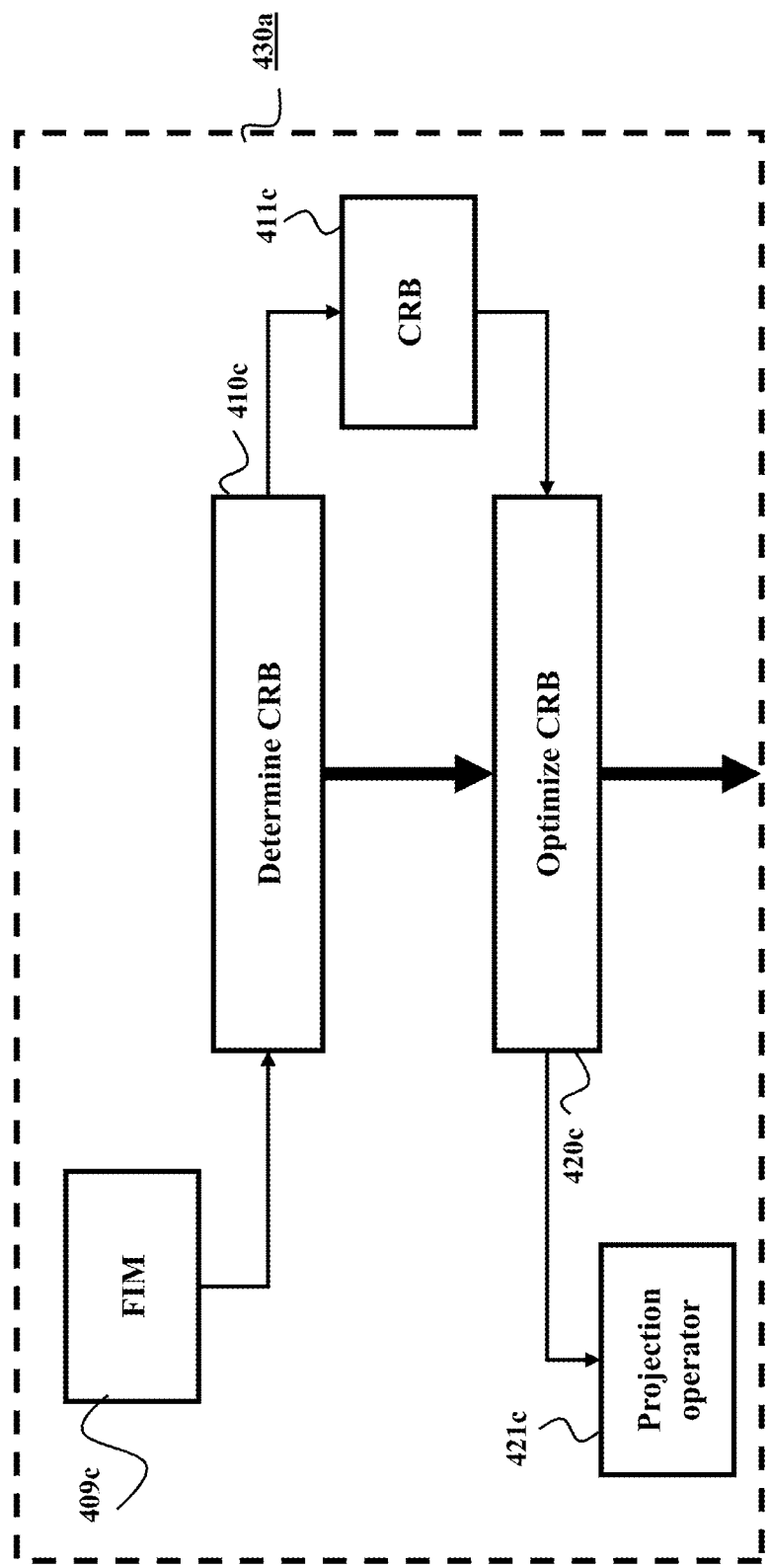
FIG. 4C shows a flowchart of an exemplar implementation of a method for determining the CRB using a coarse position as a function of the projection operator according to one embodiment.

FIG. 4C shows a flowchart of a method 430a for determining the projection operator to produce the subset of measurements according to some embodiments. First, the method 430a determines 410c the CRB 411c using the reduced FIM 409c. Next, In some embodiments, the method determines the CRB as the trace of the inverse of the reduced FIM, $\text{T}_r(\lceil(\Psi H_p)^T(\Psi R\Psi^T)^{-1}\Psi W H_p\rceil^{-1})$, i.e., by summing the diagonal elements of the inverse of the reduced FIM. Using the determined CRB 411c as a function of the projection operator, the method optimizes the CRB by selecting the projection operator that produces the optimal subset of measurements minimizing the loss of information relative to the full set of measurements, to find a projection operator 421c $\Psi_k:\mathbb{R}^{2\tilde{M}}\rightarrow\mathbb{R}^{\tilde{M}}$ projecting the full set of measurements to a subset of measurements $\tilde{y}_k=\Psi_k(y_k)$.

The method is based on the understanding that the position is uncertain, but the uncertainty is much smaller than the distance between receiver and the satellites. For instance, referring to FIG. 1G, an estimation of receiver position using code measurements results in an estimation error in the order of a few meters. However, the distance between a receiver and the satellites can be thousands of kilometers. One embodiment utilizes this to determine a coarse position, e.g., using code measurements, to determine the CRB as a function of input measurements.

Figure 4D:
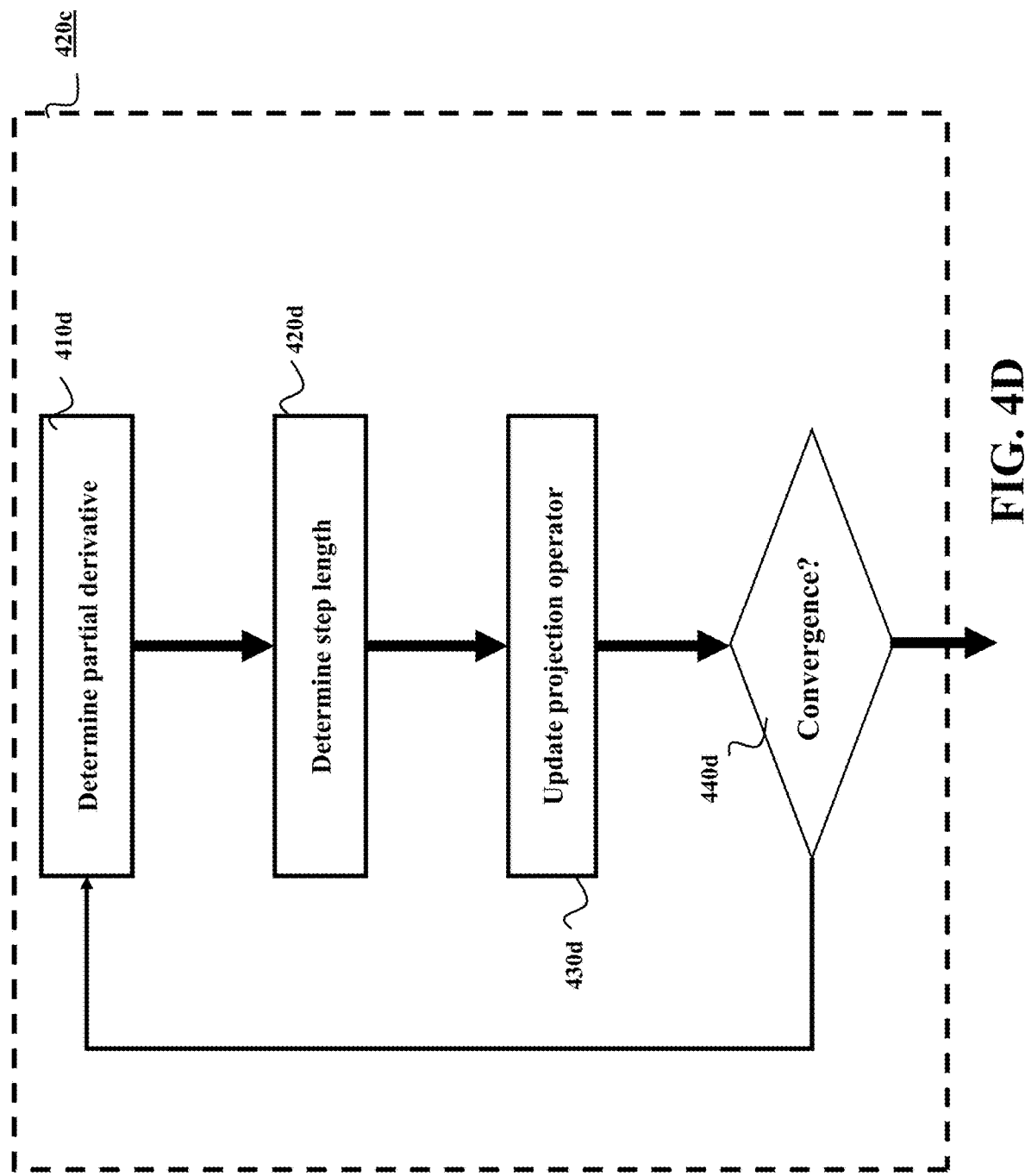
FIG. 4D shows a flowchart of a method for finding the optimal projection operator finding the subset of measurements minimizing the loss of information according to one embodiment.

FIG. 4D shows a flowchart of a method for optimizing the CRB finding the optimal projection operator finding the subset of measurements minimizing the loss of information according to one embodiment. The optimization problem of minimizing the CRB is formulated as $$\min_{\Psi\in\mathbb{R}^{\tilde{M}\times M}} J(\Psi), \text{ wherein } J(\Psi) = Tr\big([(\Psi H_p)^T(\Psi R\Psi^T)^{-1}\Psi H_p]^{-1}\big).$$

The optimization problem is solved using a gradient descent method and the method iterates until a convergence criterion is met. The method determines 410d a partial derivative of the CRB. One embodiment is based on the understanding that even though the CRB is a highly nonlinear function, its derivative can be determined as an analytic function $$\frac{\partial Tr(\mathcal{I}(\tilde{y};\theta)^{-1})}{\partial \Psi} = -2UQ\Lambda^{-2}Q^T V^T, \text{ wherein}$$

$$Y = H_p^T\Psi^T(\Psi R\Psi^T)^{-1}\Psi H_p,$$

-continued $$U = (\Psi R \Psi^T)^{-1} \Psi H_p,$$

$$V = H_p - R\Psi^T U, \text{ and where}$$

$$Y = Q\Lambda Q^T \text{ and } H_p = \left.\frac{\partial h_p(\theta)}{\partial \theta}\right|_{\theta=p^*}.$$

One embodiment is based on the recognition that in order to determine the derivative, rank conditions need to be met. Another embodiment understands that the rank condition is met whenever there are at least 3 SD or DD satellite signals available. In one embodiment, this rank constraint is imposed by adding a rank constraint to the optimization problem.

Next, the method determines a step length 420*d* γ using a line search to control the movement of the solution along the direction of the gradient. In other words, controlling the step length guarantees convergence of the method to a local optimum.

Using the step length and derivative of CRB, the method updates 430*d* the projection operator by taking a step with length γ along the direction of the derivative of the CRB as a function of the projection operator. In one embodiment, this is done according to $$\Psi_{k,n} = \Psi_{k,n-1} + 2\gamma U_n Q_n \Lambda_n^{-2} Q_n^T V_n^T,$$

$$[\Lambda_n, Q_n] = eig(Y_n),$$

$$Y_n = H_{p,k}^T \Psi_{k,n-1}^T U_n,$$

$$V_n = H_{p,k} - R_k \Psi_{k,n-1}^T U_n,$$

$$U_n = (\Psi_{k,n-1} R_k \Psi_{k,n-1}^T)^{-1} \Psi_{k,n-1} H_{p,k},$$

$$H_p = \left.\frac{\partial h_p(\theta)}{\partial \theta}\right|_{\theta=p^*},$$

If the convergence criterion is met 440*d*, the method outputs the projection operator, and if not, the method determines 410*d* the partial derivative using the updated projection operator.

Some embodiments acknowledge the fact that even though linearization causes the CRB to be approximate, the linearization has negligible effect since the distance between satellite and receiver is large. In other words, using the coarse position, as long as the error is within a few meters, has little effect on the linearization error.

One embodiment is based on the understanding that from an algorithmic standpoint, the combination of satellites does not have to include full satellites. For instance, consider the case of having five satellites and choosing four of these. Then, it may be better to use a fourth of the measurement of the first satellite and three fourths of the fourth satellites, than to combine full satellite measurements. In other words, the combination of satellite measurements forming a measurement is a noninteger combination of satellites. Intuitively, this is because the FIM captures the uncertainty in the system, and although a combination of full satellites has highest probability, since there is some uncertainty about the correctness of such combination, it is safer from an MSE standpoint to choose noninteger combinations.

Figure 4E:
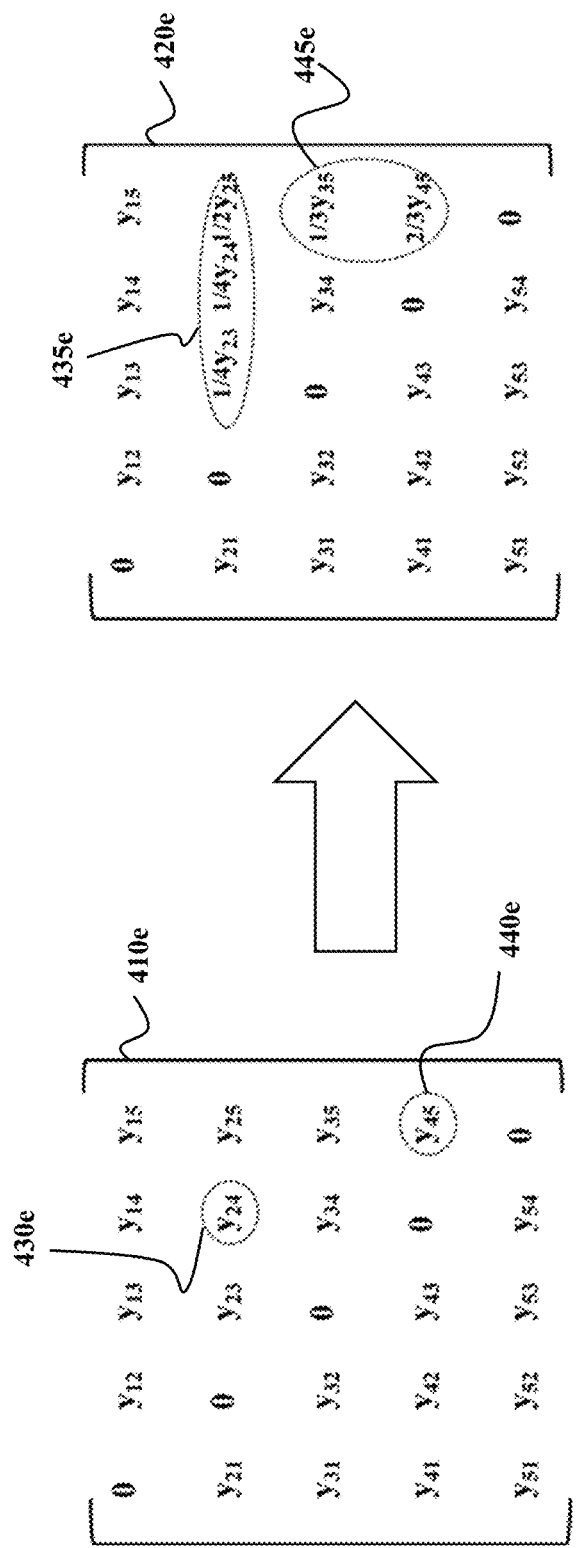
FIG. 4E shows a schematic of fractional measurement representations according to some embodiments.

FIG. 4E shows a schematic of fractional measurement representations according to some embodiments. In this example, measurements of matrix 410*e* is represented as weighted combinations of different measurements 420*e*. For example, a measurement 430*e* is replaced with a weighted combination 435*e*, while a measurement 440*e* is replaced with a weighted combination 445*e*. Some embodiments are based on the recognition that the cost function is scale invariant, i.e., $J(\alpha\Psi)=J(\beta\Psi)$ for all $\beta\neq 0$, $\alpha\neq 0$. Hence, the linear operator can be normalized to keep the magnitude of the projected measurements constant. For example, in some implementations, the weighted combination of different measurements is a combination such that all weights sum to one. In other implementations, the projection operator resulting from the optimization program is normalized, e.g., it is scaled to have unity norm. Doing such normalizations can be beneficial when implementing on embedded hardware with finite numerical precision.

One embodiment is based on the understanding that projecting the measurements into a subset of measurements will always mean a loss of information, i.e., the cost function $J(\Psi)$ will never be smaller than $J(I)$, as the linear combination of measurements cannot contribute any new information. In one embodiment, this understanding is used to determine the quality of the solution of the optimization program. E.g., if the ratio $J(\Psi)/J(I)\to 1$, the linear projection operator resulting from the optimization gives the same performance as when using the full set or measurements. Similarly, if the ratio is large, the optimized projection operator is suboptimal and will lead to degraded performance. Hence, when the ratio is large, one embodiment increases the allowed maximum number of measurements in the subset of measurements to find a better projection operator. In some implementations, this procedure is iterated until a suitable ratio has been determined.

Figure 5A:
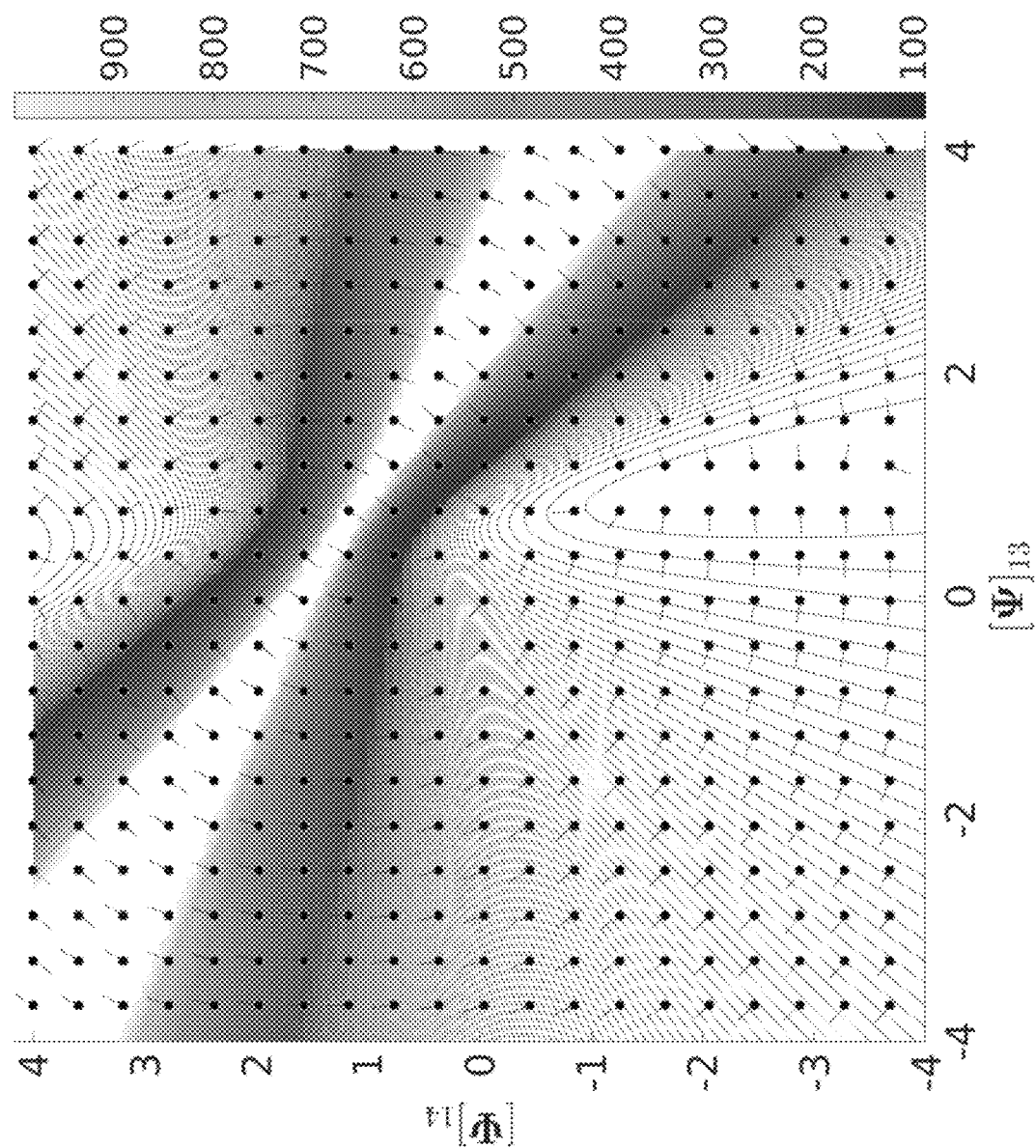
FIG. 5A illustrates the level sets of the CRB when varying two of the matrix elements of a particular choice of projection operator with according to one embodiment.
Figure 5B:
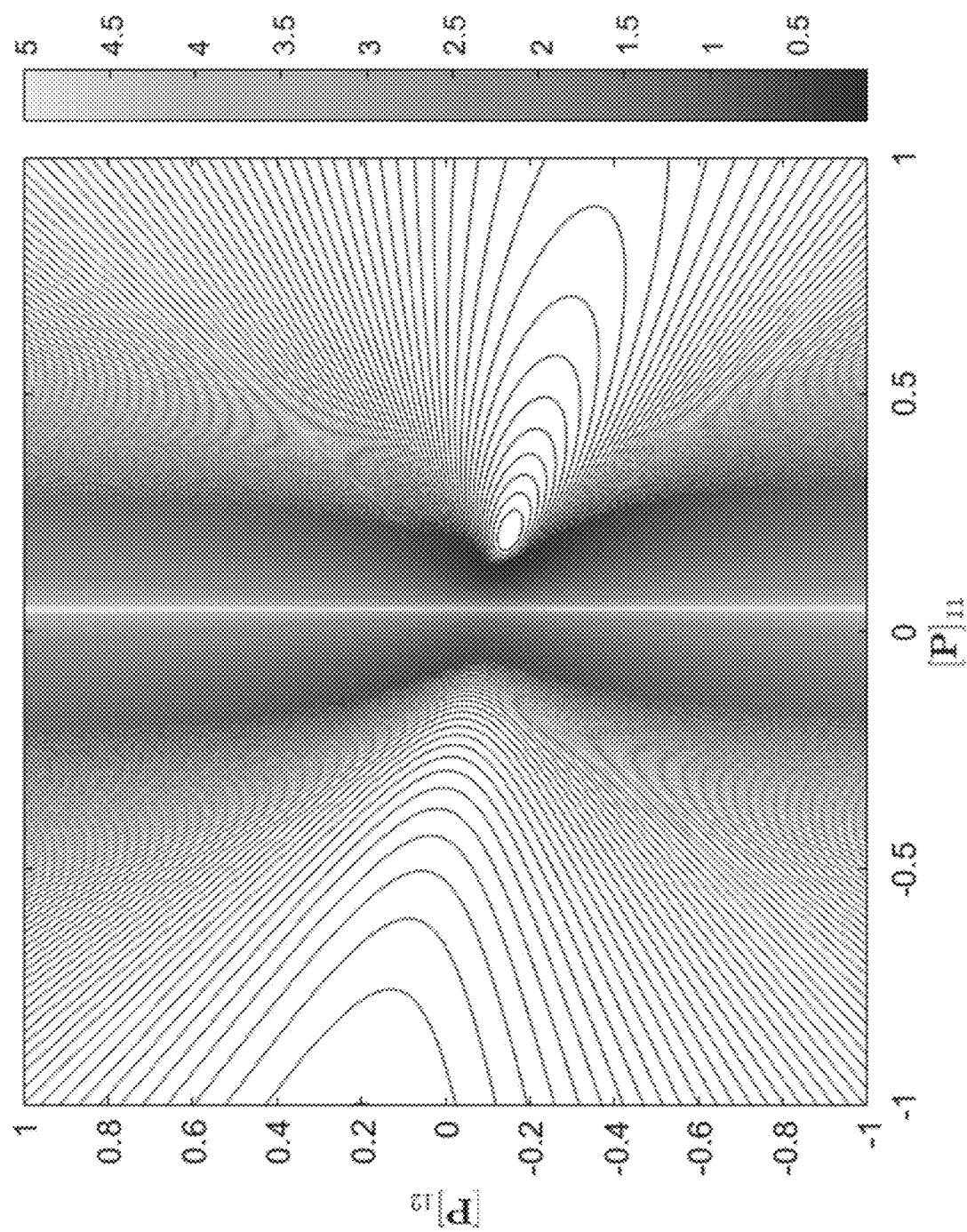
FIG. 5B illustrates the level sets of the CRB when varying two of the matrix elements of a particular choice of projection operator with according to one embodiment.
Figure 5C:
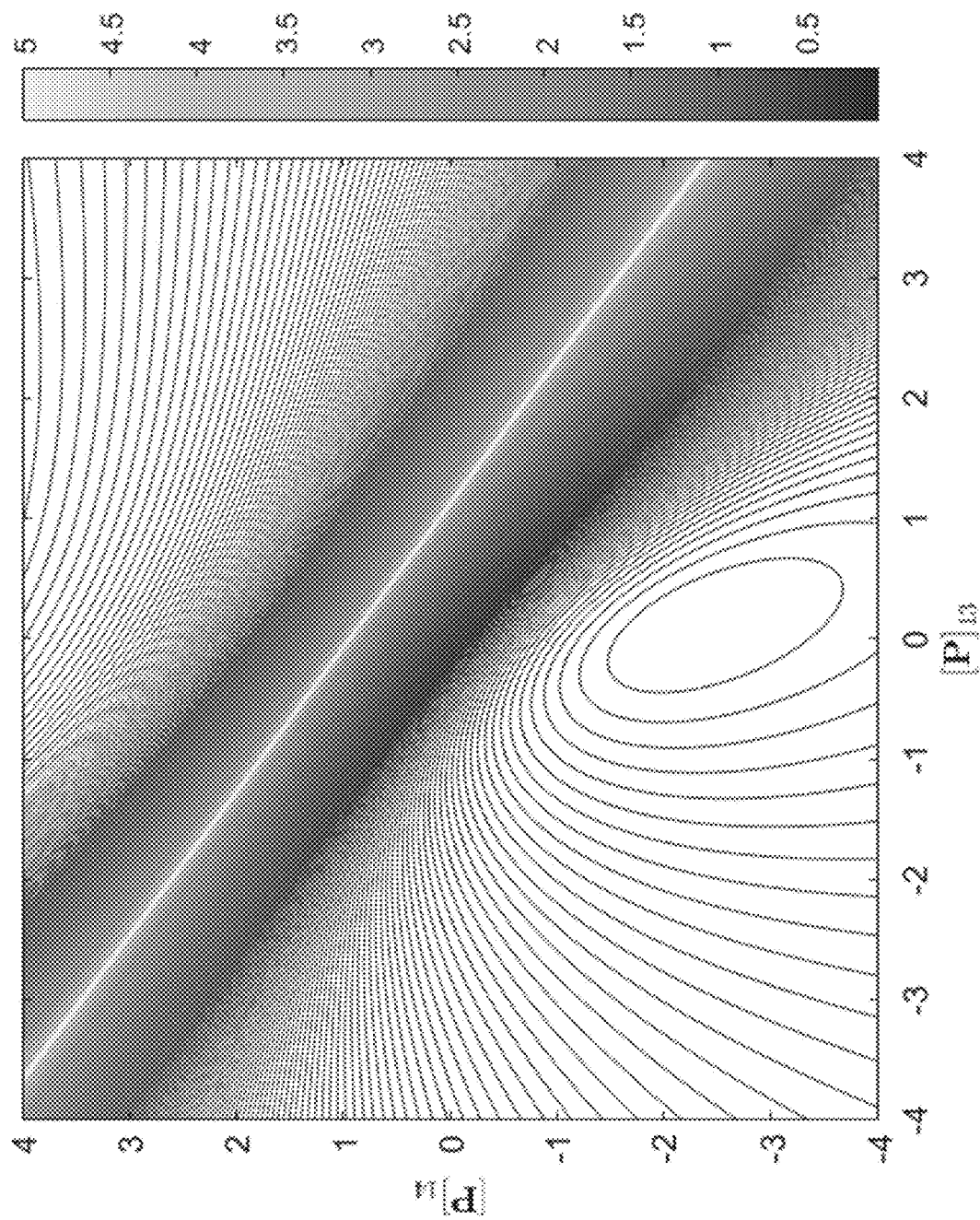
FIG. 5C illustrates the level sets of the CRB when varying two of the matrix elements of a particular choice of projection operator with according to one embodiment.

FIGS. 5A 5B, and 5C illustrate the level sets of the CRB when varying two of the matrix elements of a particular choice of projection operator with. The level sets are globally nonconvex, but convex for large parts of the regions. Furthermore, the illustrations indicate that it is suboptimal to choose full satellites as part of the subset of measurements. In other words, the FIM defines a space in a system of coordinates of the set of measurements, wherein it is possible to find a surface of the space corresponding to the subset of measurements and finds a point on the surface with maximum value of elements of the FIM.

Various receiver state estimators can be implemented using the subset of measurements. For instance, one embodiment uses a Kalman filter combined with an integer least squares solver to determine the state of the receiver.

Figure 6A:
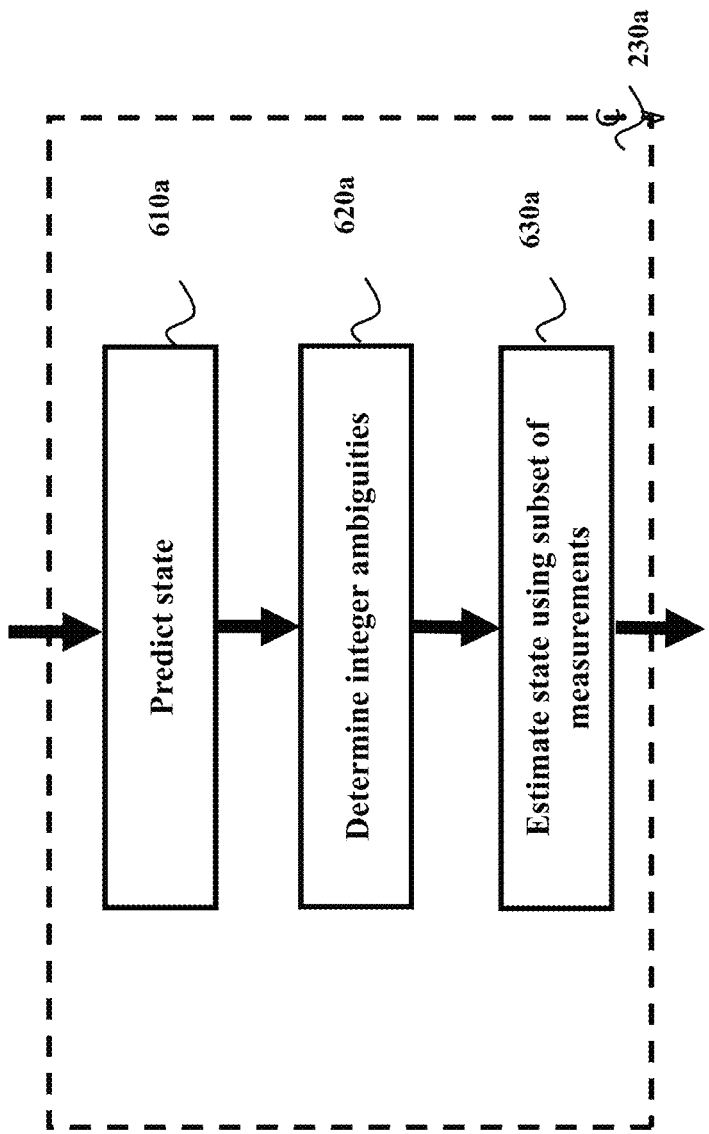
FIG. 6A shows an example of execution of one iteration of a state estimator according to one embodiment.

FIG. 6A shows an example of execution of one iteration of a state estimator 230*a* according to one embodiment. Using motion data of the receiver and the motion model described according to other embodiments, the method 610*a* predicts the state from a previous state to a current state. Then, the method determines 620*a* the integer ambiguities of carrier phase signal that best fits to the predicted state. Any integer solver can be used. For example, one embodiment uses an integer least squares solver LAMBDA and variations of it for determining the integer ambiguities. Using the integer ambiguities determined using the predicted state, the method estimates 630*a* the states using the subset of measurements.

Other embodiments are based on the understanding that there may be multiple possible integer ambiguities, and that multiple state estimators can be executed for the different integer possibilities.

Figure 7A:
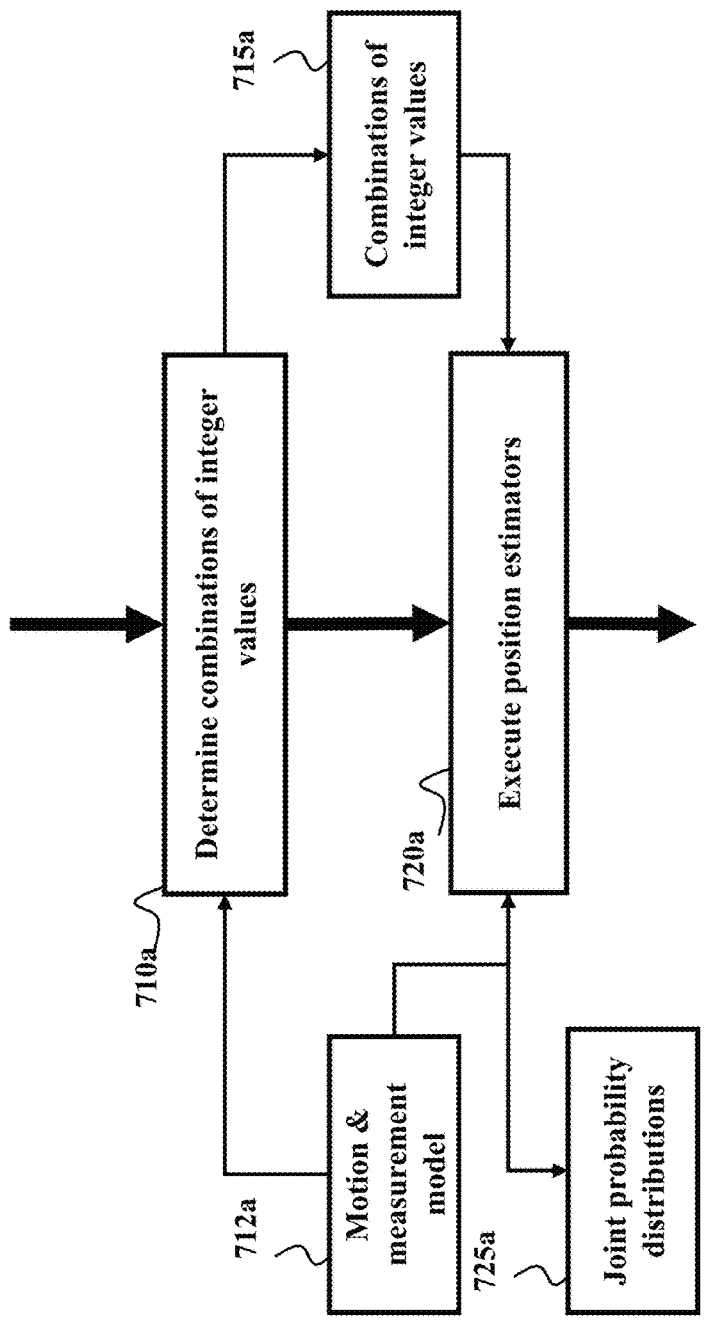
FIG. 7A shows a flowchart of one iteration of a method for state estimation of a receiver where multiple Kalman filters are executed for different integer possibilities.

For example, FIG. 7A shows a flowchart of one iteration of a method for state estimation of a receiver 130 where multiple Kalnan filters are executed for different integer possibilities.

Using the set of measurements, the method determines 710a a set of possible combinations of integer values 715a of the carrier phase ambiguities consistent with the measurements of the carrier and the code signals according to one or combination of the motion model and the measurement model 712a within bounds defined by one or combination of the process noise and the measurement noise. This step is based on understanding that instead of attempting to determine the carrier phase ambiguities to perform a state estimation, it is beneficial to determine and test different possible combination of the carrier phase ambiguities for the state estimation. In such a manner, the best carrier phase ambiguities can be selected using the probabilistic model better reflecting the nuances of the state estimation.

To that end, the method executes a set of state estimators, e.g., modified Kalman filters, determining the state of the receiver by jointly using the motion model and the measurement model 712a. Each state estimator includes its corresponding combination of the integer values of the carrier phase ambiguities to determine a joint probability distribution 725a of the position of the receiver with respect to the motion model and the measurement model 712a. In such a manner, the combinations of the integer values of the carrier phase ambiguities can be evaluated probabilistically, because the measurement models of at least some different position estimators include different combinations of integer values of the carrier phase ambiguities selected from the set of possible combinations 715a. Next, the method determines the state of the receiver using a state estimator with the highest joint probability of the state of the receiver according to the subset of measurements of the carrier and the code signals.

To that end, some embodiments are based on realization that estimation of the range of possible integer values of carrier phase ambiguities as well as the selection of the integer values of carrier phase ambiguities from that range can be done probabilistically using consistency of the motion and the measurement models with respect to a PDF of the noise of the measurement model.

Figure 7B:
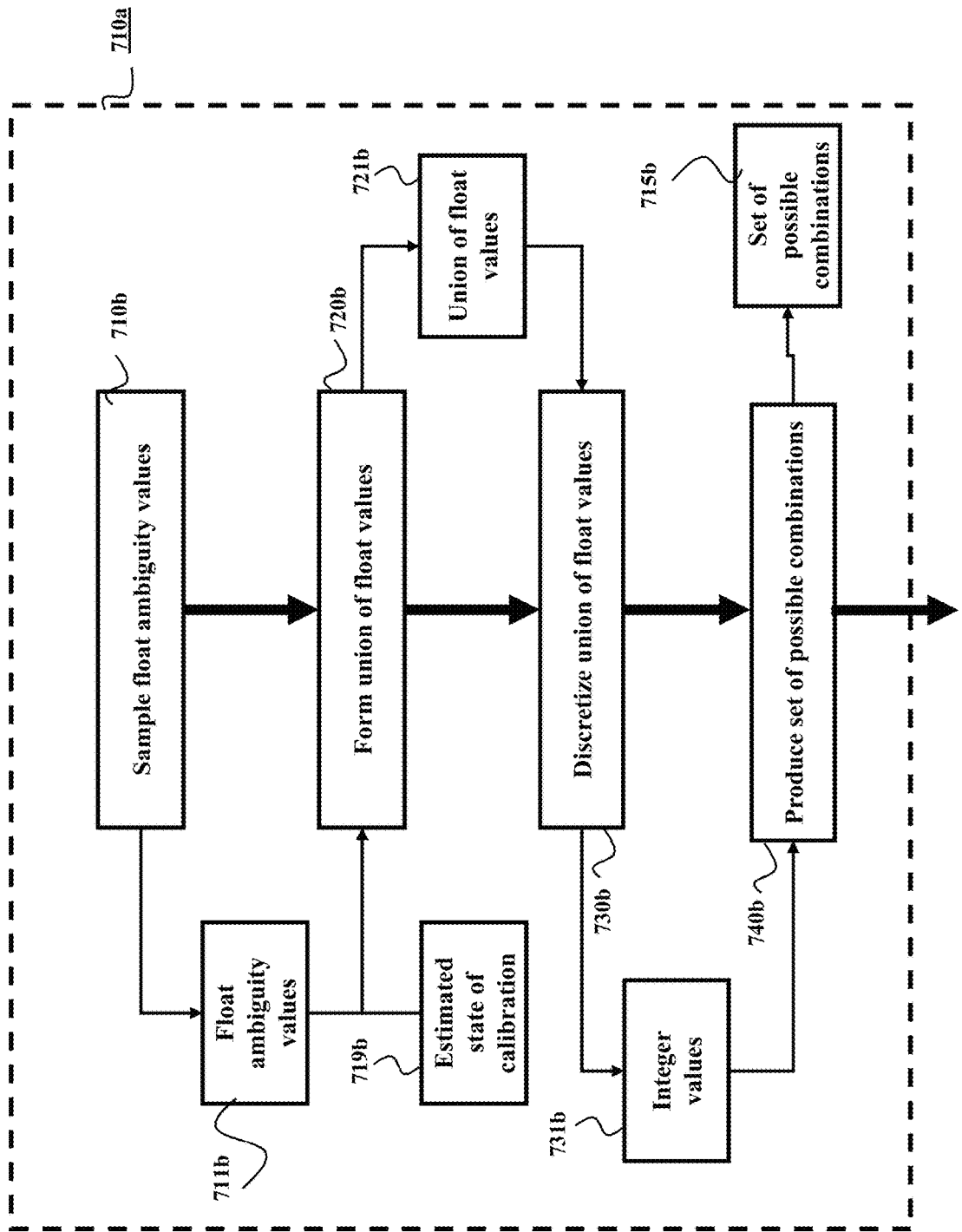
FIG. 7B shows a flowchart of a method for determining the possible combinations of integer values of the carrier phase ambiguities according to some embodiments.

FIG. 7B shows a flowchart of a method for determining 710b the possible combinations of integer values of the carrier phase ambiguities according to some embodiments. The method can be implemented using a processor. For at least one position of the receiver consistent with the process noise of the motion model, the method samples 710b float values 711b of the carrier phase ambiguity, for at least one satellite, on a PDF of the measurement noise centered on a noiseless fit, i.e., the measurement model without noise, of the carrier phase ambiguities, the position, and the measurements of the carrier and code signals into the measurement model.

In some embodiments, the PDF of the measurement noise is predetermined based on, e.g., characteristics of the GNSS receiver. In such a manner, the noiseless fit places the PDF in a position that the sampling on the PDF deemphasize the probabilistic noise of the motion and the measurement models and emphasize the effect of the carrier phase ambiguities on the position estimation.

Then, the method forms 720b a union of the sampled float values, to produce a union 721b that contains all of the sampled float values; discretizes 720b the union of float values in an integer basis to produce possible integer values 731b of the carrier phase ambiguity for the set of GNSS satellites. Finally, the method uses the possible integer values 731b of carrier phase ambiguities for all satellites, to produce 740b a set of possible combinations 725b of integer values.

Figure 7C:
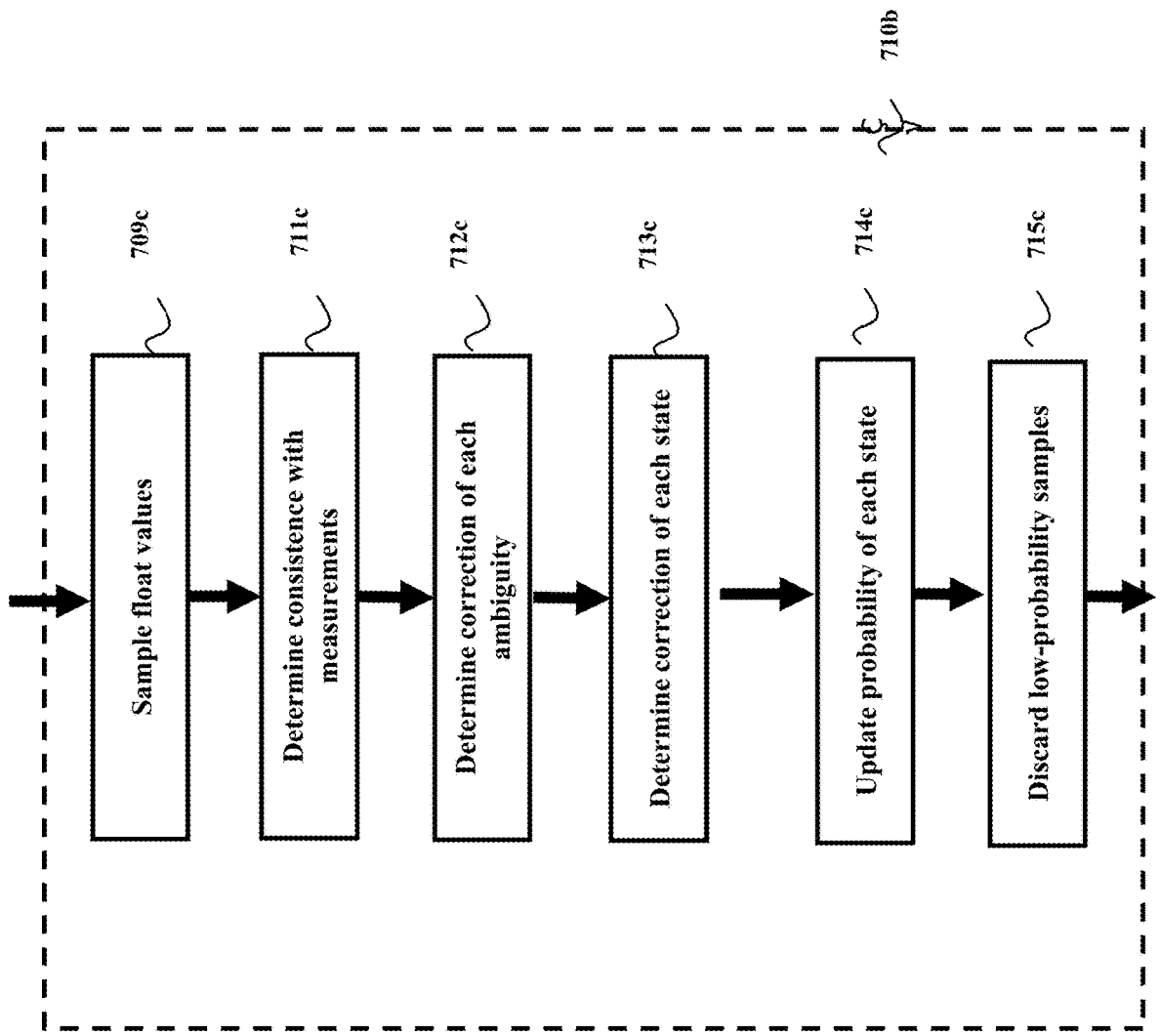
FIG. 7C shows a flowchart of an exemplar implementation of the method that samples the float values according to one embodiment.

FIG. 7C shows a flowchart of an exemplar implementation of the method 710b that samples the float values according to one embodiment. However, the sampling 710b the float values are implemented in several ways by different embodiments. The method of FIG. 7C samples 709c float values consistent with the motion model and its process noise. The method determines 711c consistence with the measurements of the code and carrier phase signals, by inserting sampled carrier phase ambiguities, the estimated position, and the set of measurements of the carrier and the code signals into the measurement model. Based on the consistence with the measurement, the method corrects 712c each sampled float value as a function of the process noise and the measurement noise; corrects 713c the state based on the corrected float value using the subset of measurements; updates 714c the probability of each ambiguity based on the consistence with the measurements after correction; and prunes 715c the corrected sampled float values of carrier phase ambiguities to preserve the float values of carrier phase ambiguities with probabilities of fitting into the measurement model above a threshold.

Some embodiments are based on realization that the probabilistic nature of the motion and measurement models is captured by a probability density function (PDF) defined by float values.

Other embodiments estimate the PDF of the state and ambiguities by a set of N particles, resulting in the PDF $p(x_k, n_{0:k}|y_{0:k})$, where $y_{0:k}$ are the measurements of the carrier and code signals. For instance, one embodiment represents the PDF of the ambiguity conditioned on the carrier and code measurements as a weighted sum of the integer ambiguity hypotheses, $$p(n_{0:k} \mid y_{0:k}) \approx \sum_{i=1}^{N} q_k^i \delta(n_{0:k}^i - n_{0:k}),$$

where $q_k^i$ is the probability of the ith sampled float ambiguity.

Figure 8A:
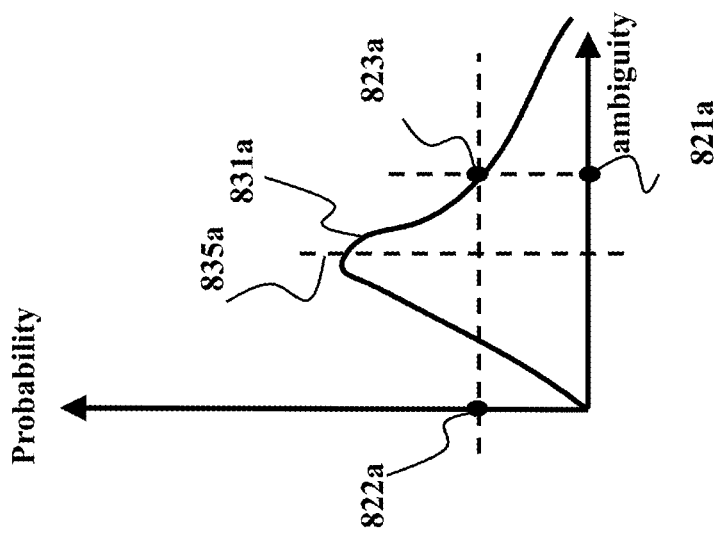
FIG. 8A shows a graph illustrating selection of the probability of the sampled ambiguities using the PDF over possible states of the receiver according to one embodiment.

FIG. 8A shows a graph illustrating selection of the probability of the sampled ambiguities using the PDF 831a over possible states of the receiver according to one embodiment. For example, the PDF 831a can be a probability distribution of the measurement model. The shape of such a probability distribution can be determined in advance, e.g., as a Gaussian or different shape, and the location of this probability distribution 831a is centered on the noiseless fit of the measured state 835a.

One embodiment determines a probability distribution of the state of the receiver and/or the ambiguity using a probability distribution 831a of the measurement model centered on the measured state, using the subset of measurements. To that end, the embodiment can determine the probability of each sampled ambiguity to represent the true ambiguity according to a placement of the ambiguity and the estimated position on the probability distribution of the state of the receiver and the ambiguity.

For example, the embodiment submits the ambiguity to the model of the subset of measurements of the carrier and code signal. The embodiment selects a value 822a of the PDF over states of the receiver at a point 823a corresponding to the fit of the measurement model of the subset of measurements with the ambiguity 821a to the measured state as the probability of the ambiguity to be accurate.

In some embodiments, when the probability of a sampled ambiguity is lower than a threshold, the corresponding ambiguity is removed from the determining and is replaced with a sampled ambiguity with higher probability. Doing in such a manner ensures that only sampled ambiguities that are more likely to be the correct ambiguity can be chosen.

In other embodiments, the sampled ambiguity is determined by first drawing a sample from the process noise, then; using the sampled process noise correcting the sample by a Kalman-type correction $$p(n_k|n_{k-1}^i, u_{0:k}) \approx \mathcal{N}(n_k|\hat{n}_k^i, (\Sigma_k^i)^{-1})$$

$$\hat{n}_k^i = n_{k-1}^i + K_k^i(y_k - \hat{y}_{k|k-1}^i),$$

$$\Sigma_k^i = ((S_k^i)^{-1} + (Q_n)^{-1})^{-1},$$

$$K_k^i = Q_n(Q_n + S_k)^{-1},$$

$$\hat{y}_{k|k-1}^i = h(\hat{x}_{k|k-1}^i) + \lambda \bar{n},$$

that is, every sampled ambiguity is corrected with the difference from the measurement $y_k$ and the fit $\hat{y}_{k|k-1}^i$ of the measurement model using the sampled ambiguity and the estimated position corresponding to the sampled ambiguity. With this correction, the probability of the ambiguity is determined from the probabilistic measurement model as a Gaussian function of the process and measurement noise, the sampled ambiguity, and the estimated position.

Figure 8C:
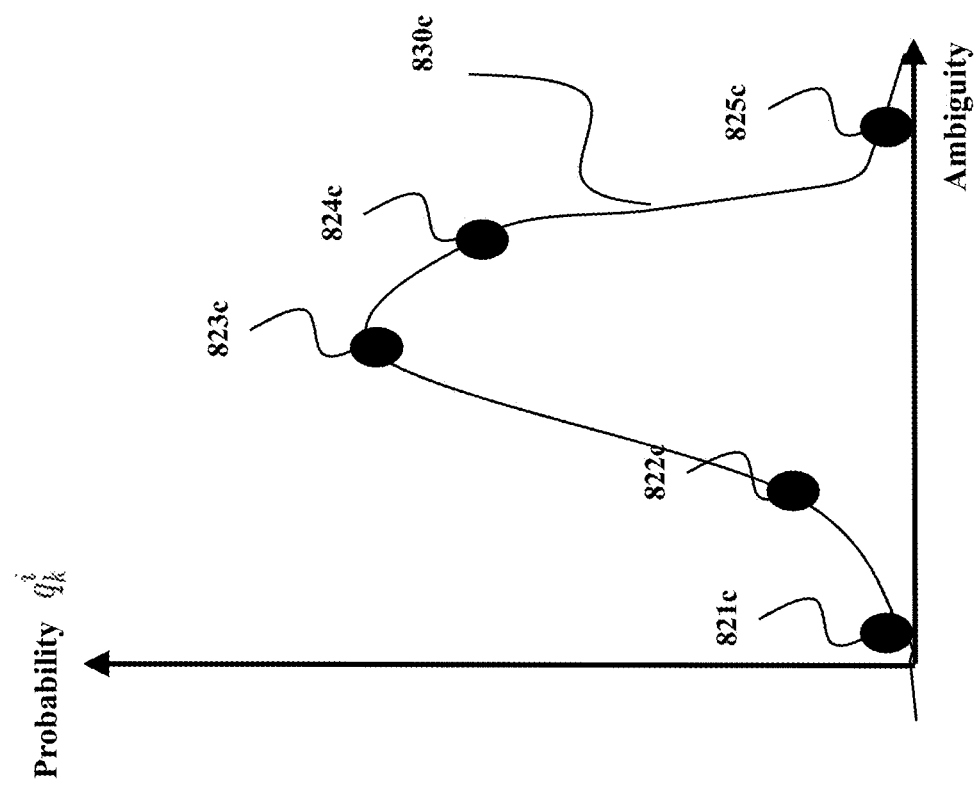
FIG. 8C shows an illustration of a result of a method for interpolating and extrapolating the probabilities of float values of the carrier phase ambiguities sampled according to some embodiments.

FIG. 8B shows a schematic of probabilities of the float values of the carrier phase ambiguities sampled according to some embodiments. FIG. 8B shows five float values of the carrier phase ambiguities having the assigned probabilities 821b, 822b, 823b, 824b, and 825b. The probabilities constitute a discrete distribution different from the exact range of possible ambiguities. One embodiment interpolates and extrapolates the probabilities of the float values of the carrier phase ambiguities to form a continuous probability density function and selects at least one section of the continuous probability density function above the threshold as a range of the integer values of the carrier phase ambiguities FIG. 8C shows an illustration of a result of a method for interpolating and extrapolating the probabilities of float values of the carrier phase ambiguities sampled according to some embodiments. The interpolating connects a curve 830C between the points, and the extrapolating makes the curve 830C extend beyond the discrete points.

Figure 8D:
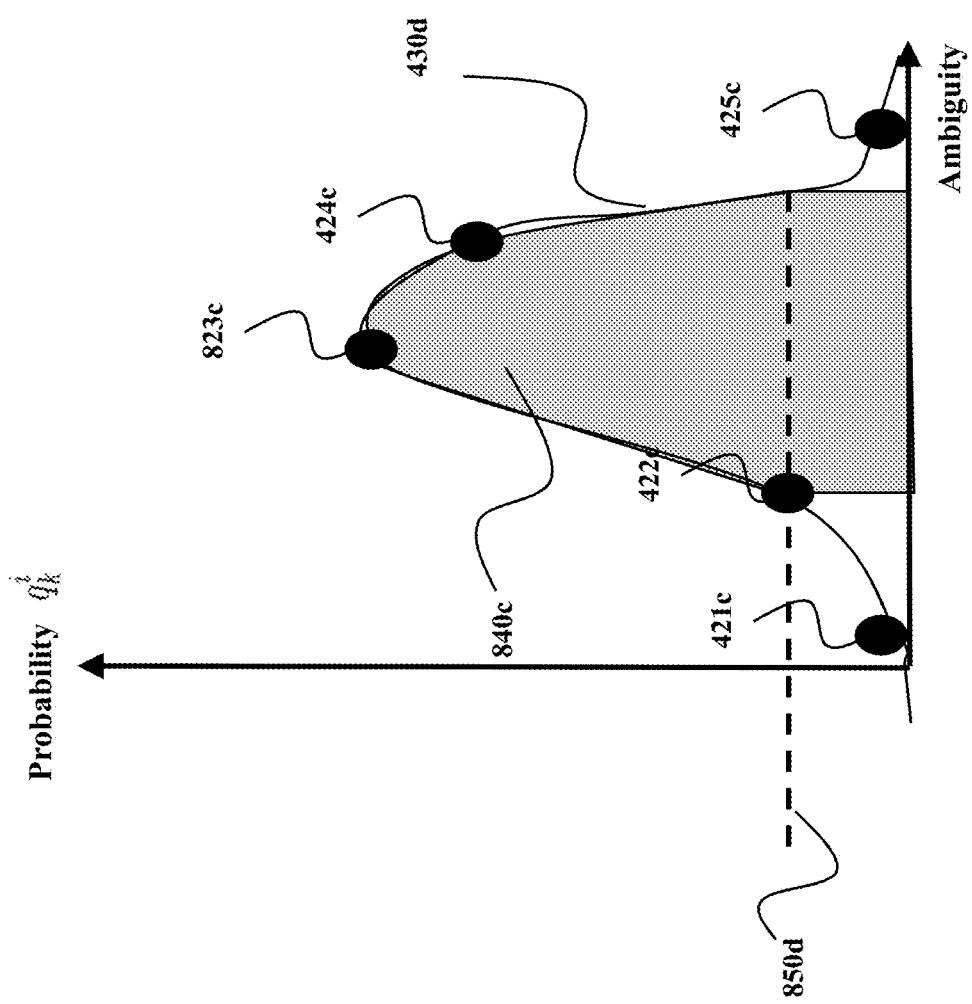
FIG. 8D shows an illustration of selecting different regions of ambiguity values according to one embodiment.

In some embodiments, a section of the curve 830c is selected. For instance, FIG. 8D shows a situation where the region 840d is selected, which means that the ambiguity values corresponding to the region forms the basis of the set of possible integer values. The selecting can be done in several ways. For instance, one embodiment selects the section of the continuous PDF that is above the threshold 850d.

Based on the selected integer values, one embodiment executes a set of state estimators, where each state estimator uses a unique set of ambiguities in the measurement model. For instance, one embodiment uses a set of Kalman filters that estimate the state using the motion model and adjust the estimated state using the measurement model with the subset of measurements of the carrier and the code signals adjusted according to the integer values of the carrier phase ambiguities selected for the state estimator. The Kalman filter determines the joint probability of the position based on a consistency of the adjusted state with the measurement model using the subset of measurements.

For instance, in one embodiment the Kalman filter estimates the position and velocity and associated covariance as $$\hat{x}_{k+1|k} = F_k \hat{x}_{k|k},$$

$$P_{k+1|k} = F_k P_{k|k} F_k^T + Q_{x,k},$$

and adjusts the estimated position and covariance based on the subset of measurements carrier and code signal measurements as $$\hat{x}_{k|k}^i = \hat{x}_{k|k-1}^i + K_k(\tilde{y}_k - \hat{\tilde{y}}_{k|k-1}^i),$$

$$P_{k|k}^i = P_{k|k-1}^i - \tilde{K}_k \tilde{H}_k P_{k|k-1},$$

$$\hat{\tilde{y}}_{k|k-1}^i = \Psi_{k,\infty}[h(\hat{x}_{k|k-1}^i) + g(n_k^i)],$$

$$\tilde{S}_k = \tilde{H}_k P_{k|k-1} \tilde{H}_k^\top + \tilde{R}_k,$$

$$\tilde{K}_k = P_{k|k-1} \tilde{H}_k^\top \tilde{S}_k^{-1},$$

$$\tilde{H}_k = \Psi_{k,\infty} \frac{\partial h(x)}{\partial x}\bigg|_{x=\hat{x}_{k|k-1}},$$

where the ambiguity n is a vector of ambiguities, unique for each different Kalman filter, wherein $\Psi_{k,\infty}$ is the linear projection operator determined by other embodiments, wherein $\tilde{y}_k = \Psi_{k,\infty} y_k = \Psi_{k,\infty}(h(x_k) + g(n_k) + e_k)$, i.e., the subset of measurements, wherein $\tilde{R}_k = \Psi_{k,\infty} R_k \Psi_{k,\infty}^T$ is the measurement noise of the subset of measurements.

The executing the Kalman filters result in a mixture distribution of Gaussian distributions, $$p(x_k | y_{0:k}) \approx \sum_{i=1}^{N_S} \omega_k^i \mathcal{N}(x_k | \hat{x}_{k|k}^i, P_{k|k}^i),$$

where the $N_S$ different Kalman filters each produce a Gaussian distribution. The distribution of the state is a weighted distribution, where each weight $w_k^{i*}$ reflects how good the state estimate is, therefore also it reflects how good the choice of integer ambiguities is.

One embodiment determines the weight as the probability of the particular choice of integer ambiguity values, that is, $\omega_k^i = p(n^i|y_{0:k})$. Another embodiment determines the probability of the particular choice of ambiguity integer values as the value when inserting the estimates from the Kalman filter into a Gaussian distribution, weighted with the probability of the ambiguity in the previous time step, $\omega_k^i \propto \omega_{k-1}^i \mathcal{N}(\gamma_k|\hat{y}_{k|k-1}^i, S_k^i)$.

Several embodiments realize that to evaluate the quality of the estimation, i.e., the probability of each estimator, can be done by evaluating the Gaussian distribution when inserting the estimation and subset of measurements.

The determined weights can be used to determine the state estimate. For instance, one embodiment outputs the state estimate that is determined as a weighted combination of the estimates of all the Kalman filter, $$\hat{x}_{k|k}^{MV} = \sum_{i=1}^{N_S} \omega_k^i \hat{x}_{k|k}^i.$$

In other embodiments, the estimate is determined from the Kalman filter associated with the highest weight $\omega_k^i$.

Sometimes the set of possible combinations of integer values can change, for instance, due to loss-of-lock of a satellite for a period of time, receiving signals from more satellites, or multipath detection.

When initializing the position estimate, there may be little information about where the receiver is located. Sometimes it is possible to acquire a coarse information from the base receiver, a car navigation system, or Wi-Fi stations. One embodiment samples positions around a first course estimate of the position to produce the positions of the receiver, where the spread of the sampling is consistent with the uncertainty of the model of the receiver.

Another source of error is loss of one or more satellites, from which position information is lost and the current estimate cannot be trusted. One embodiment resolves this by sampling states of the receiver in a neighborhood of the most recent known state to produce the state of the receiver consistent with the process noise of the motion model. For instance, one embodiment keeps track of the most recent known state estimate, samples around this estimate such that the samples are consistent with the process noise, and propagates the sampled state with the motion model.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for tracking a state of a receiver of a global navigational satellite system (GNSS), comprising:
   an input interface to accept motion data indicative of a change of a state of the receiver and measurements of satellite signals including a combination of carrier signals and code signals transmitted from a set of GNSS satellites, wherein a measurement for each satellite signal includes at least a single difference measurement of a satellite signal to represent a relative position of the receiver of the satellite signal with respect to a position of a satellite transmitting the satellite signal subject to integer ambiguity of the carrier signal of the satellite and noise, such that all possible measurements for each satellite signal at a current time step form a set of measurements;
   a memory configured to store a motion model transitioning a previous state of the receiver to a current state of the receiver according to the motion data, wherein the motion model is a probabilistic model subject to process noise, to store a measurement model relating a subset of the measurements of satellite signals to the current state of the receiver, wherein the size of the subset of measurements is less than the size of the set of measurements, wherein each measurement in the subset of measurements is a weighted combination of different measurements, wherein the weighted combination of different measurements is normalized, such that weights of the weighted combination sums to one, and wherein the measurement model is a probabilistic model subject to measurement noise, and to store a state estimator configured to track the state of the receiver using a joint probability of the state of the receiver estimated by the motion model and the measurement model; and
   a processor to track the state of the receiver, the processor is configured to
      select the subset of measurements by minimizing a loss of information in the subset of measurements with respect to the set of measurements; and
      execute the state estimator with the motion model using the motion data and the measurement model using the selected subset of measurements to estimate the state of the receiver.

2. The system of claim 1, wherein the information is a cost function of input measurements, such that the loss of information is a difference between the cost function of having the set of measurements as the input measurements and the cost function of having the subset of measurements as the input measurements.

3. The system of claim 2, wherein the cost function is a function of the Fisher information of the input measurements.

4. The system of claim 3, wherein, to select the subset of measurements, the processor optimizes elements of a Fisher information matrix of the set of measurements with respect to a coarse position of the receiver provided in the code signals.

5. The system of claim 4, wherein the optimized elements of the Fisher information matrix returns the subset of measurements minimizing the variance of the coarse position of the receiver with resolution defined by the code signals.

6. The system of claim 4, wherein the processor is configured to
   determine a coarse position of the receiver corresponding to at least one code signal;
   determine the Fisher information matrix by inserting the coarse position into the measurement model;
   determine a projection operator that reduces the Fisher information matrix to a reduced Fisher information matrix of the size of the subset of measurements by minimizing the loss of information in the reduced Fisher information matrix with respect to the Fisher information matrix; and
   apply the projection operator to the full measurement matrix to produce the subset of measurements.

7. The system of claim 6, wherein the processor is further configured to determine iteratively, until a termination condition is met, the projection operator that optimizes a Cramer-Rao bound (CRB) of the reduced Fisher information matrix.

8. The system of claim 7, wherein, for performing an iteration, the processor is configured to
- determine a Cramer-Rao bound (CRB) by summing diagonal elements of the inverse of the reduced Fisher information matrix;
- determine a partial derivative of the CRB with respect to the projection operator; and
- update the projection operator in the direction of the partial derivative.

9. The system of claim 6, wherein the processor is further configured to determine the CRB for the size of the subset of measurements and determining the CRB for the full set of measurements; and
- increase the size of the subset of measurements if a ratio of the CRB of subset of measurements to the CRB of the set of measurements is larger than a threshold.

10. The system of claim 1, wherein a Fisher information matrix defines a space in a system of coordinates of the set of measurements, wherein the processor finds a surface of the space corresponding to the subset of measurements and finds a point on the surface with maximum value of elements of the Fisher information matrix, wherein the Fisher information matrix is determined by a projection operator projecting the set of measurements to the subset of measurements using a linear projection operator.

11. The system of claim 10, wherein the processor determines the projection operator by minimizing a trace of the inverse of the Fisher information matrix.

12. The system of claim 10, wherein the projection operator is determined by an iterative gradient descent solver.

13. The system of claim 10, wherein the projection operator is normalized.

14. The system of claim 1, wherein the estimator is a Kalman filter, wherein the processor is configured to
- determine a set of possible combinations of integer values of the carrier phase ambiguities consistent with the measurements of the carrier signal and the code signal according to one or combination of the motion model and the measurement model within bounds defined by one or combination of the process noise and the measurement noise; and
- execute a set of state estimators determining states of the receiver by jointly using the motion model and the measurement model, each state estimator determines a joint probability distribution of the state of the receiver with respect to the motion model and the measurement model, wherein the measurement models of at least some different state estimators include different combinations of integer values of the carrier phase ambiguities selected from the set of possible combinations.

15. The system of claim 1, wherein the receiver is arranged at a moving object, wherein the system includes a controller configured to control motion of the object based on the estimate state of the receiver.

16. A method for tracking a state of a receiver of a global navigational satellite system (GNSS), wherein the method uses a processor coupled to a memory storing a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, wherein the processor is coupled with stored instructions implementing the method, wherein the instructions, when executed by the processor carry out steps of the method, comprising:
- accepting motion data indicative of a change of a state of the receiver;
- accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements;
- selecting the subset of measurements minimizing a loss of information with respect to the set of measurements by optimizing elements of a Fisher information matrix of the set of measurements with respect to a coarse position of the receiver provided in the code signals; and
- executing the state estimator with the motion model using the motion data and the measurement model using the selected subset of measurements to estimate the state of the receiver.

17. A non-transitory computer readable storage medium embodied thereon a program executable by a processor for performing a method, wherein the medium stores a motion model transitioning a previous state of the receiver to a current state of the receiver according to the motion data, wherein the motion model is a probabilistic model subject to process noise, and a measurement model relating a subset of the measurements of satellite signals to the current state of the receiver, and wherein the measurement model is a probabilistic model subject to measurement noise, and a state estimator configured to track the state of the receiver using a joint probability of the state of the receiver estimated by the motion model and the measurement model, the method comprising:
- accepting motion data indicative of a change of a state of the receiver;
- accepting measurements of satellite signals including a combination of carrier signals and code signals transmitted from a set of GNSS satellites, wherein a measurement for each satellite signal includes a single difference between the satellite signal transmitted by a satellite and another satellite signal to include a relative position of the receiver of the satellite signal with respect to a position of the satellite subject to integer ambiguity of the carrier signal of the satellite and noise, such that all possible measurements for each satellite signal form a set of measurements;
- selecting the subset of measurements to reduce a loss of information with respect to the set of measurements by optimizing elements of a Fisher information matrix of the set of measurements with respect to a coarse position of the receiver provided in the code signals; and executing the state estimator with the motion model using the motion data and the measurement model using the selected subset of measurements to estimate the state of the receiver.

* * * * *